United States Patent
Song et al.

(10) Patent No.: US 11,881,724 B2
(45) Date of Patent: Jan. 23, 2024

(54) DEVICE AND METHOD FOR WIRELESS CHARGING

(71) Applicant: Samsung Electronics Co., Ltd., Gyeonggi-do (KR)

(72) Inventors: Mingi Song, Gyeonggi-do (KR); Dohyeon Kim, Gyeonggi-do (KR); Seho Park, Gyeonggi-do (KR); Wooram Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 418 days.

(21) Appl. No.: 17/198,370

(22) Filed: Mar. 11, 2021

(65) Prior Publication Data

US 2021/0305848 A1 Sep. 30, 2021

(30) Foreign Application Priority Data

Mar. 25, 2020 (KR) .................. 10-2020-0036036

(51) Int. Cl.
| H02J 7/00 | (2006.01) |
|---|---|
| H02J 50/40 | (2016.01) |
| H02J 50/80 | (2016.01) |
| H02J 50/60 | (2016.01) |
| H02J 50/12 | (2016.01) |

(52) U.S. Cl.
CPC ............ *H02J 50/402* (2020.01); *H02J 50/12* (2016.02); *H02J 50/60* (2016.02); *H02J 50/80* (2016.02); *H02J 2310/22* (2020.01)

(58) Field of Classification Search
USPC ................. 320/106, 107, 108, 109, 110, 112
See application file for complete search history.

(56) References Cited

U.S. PATENT DOCUMENTS

| 2010/0259217 A1 | 10/2010 | Baarman et al. |
| 2016/0118836 A1 | 4/2016 | Waldschmidt |
| 2017/0141604 A1 | 5/2017 | Park et al. |

(Continued)

FOREIGN PATENT DOCUMENTS

| KR | 10-2011-0137393 A | 12/2011 |
| KR | 10-2013-0106706 A | 9/2013 |

(Continued)

OTHER PUBLICATIONS

International Search Report dated Jun. 30, 2021.

*Primary Examiner* — Brian Ngo
(74) *Attorney, Agent, or Firm* — Cha & Reiter, LLC

(57) ABSTRACT

Provided are a wireless charging device and method. The wireless charging device may include: a first group of coils; a second group of coils; and a processor. The processor may be configured to: transmit a first ping signal through the first group of coils and the second group of coils; sense a change in current, voltage, and/or frequency occurring in the first group of coils and the second group of coils in response to the first ping signal to detect that an electronic device is placed on the wireless charging device; select at least one coil from the first group of coils and at least one coil from the second group of coils at which the change is sensed; transmit a second ping signal through the selected coils; and wirelessly transmit power to the electronic device by using the selected coils. Various other embodiments are also disclosed.

18 Claims, 13 Drawing Sheets

(56) References Cited

U.S. PATENT DOCUMENTS

| | | | |
|---|---|---|---|
| 2017/0331334 A1 | 11/2017 | Park | |
| 2018/0054086 A1 | 2/2018 | Jung | |
| 2018/0090998 A1* | 3/2018 | Jol | H02J 7/0042 |
| 2019/0124727 A1* | 4/2019 | Moon | H05B 6/062 |
| 2019/0173309 A1 | 6/2019 | Jung | |
| 2019/0327794 A1* | 10/2019 | Kwack | H05B 6/065 |
| 2019/0356175 A1 | 11/2019 | Jo et al. | |
| 2020/0036229 A1* | 1/2020 | Pinciuc | H02J 50/90 |
| 2022/0285988 A1* | 9/2022 | Partovi | H02J 50/80 |

FOREIGN PATENT DOCUMENTS

| | | | | |
|---|---|---|---|---|
| KR | 10-2016-0061121 A | 5/2016 | | |
| KR | 10-1750870 B1 | 6/2017 | | |
| KR | 10-2017-0094891 A | 8/2017 | | |
| KR | 10-1974155 B1 | 4/2019 | | |
| KR | 10-2019-0083454 A | 7/2019 | | |
| WO | WO-2019004753 A1 * | 1/2019 | | H01F 38/14 |

* cited by examiner

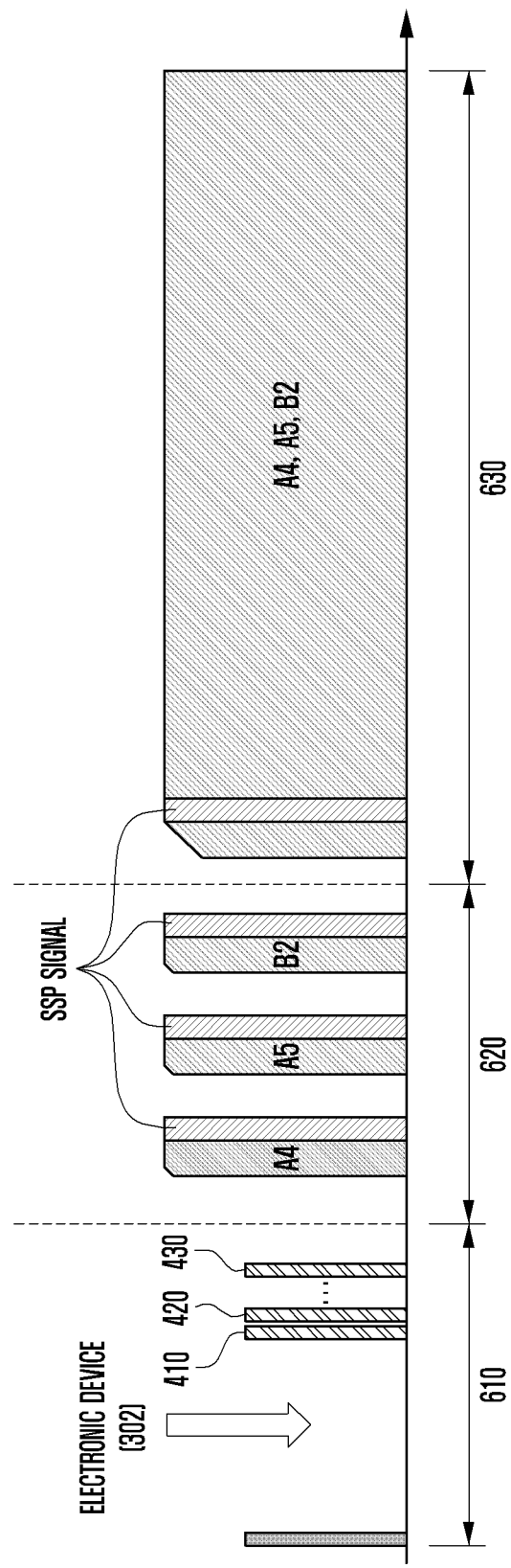

DEVICE AND METHOD FOR WIRELESS CHARGING

CROSS-REFERENCE TO RELATED APPLICATION(S)

This application is based on and claims priority under 35 U.S.C. § 119 to Korean patent application number 10-2020-0036036, filed on Mar. 25, 2020, in the Korean Intellectual Property Office, the disclosures of which is incorporated by reference herein its entirety.

BACKGROUND

Field

One or more embodiments of the instant disclosure generally relate to a wireless charging device and a method for charging an electronic device by selecting one or more of a plurality of coils included in the wireless charging device.

Description of Related Art

The use of portable electronic devices such as smartphones and tablet personal computers is increasing.

These electronic devices may each include a battery to supply power required to perform various functions. The electronic device may receive power via a wire or wirelessly from an external charging circuit to charge the battery.

Wireless charging of the electronic device uses wireless power transmission and reception, and the battery may be charged when the electronic device is in close contact with a wireless charging device. For example, the electronic device may be placed on the wireless charging device without the two being physically connected by a separate wired connector.

SUMMARY

Wireless charging of an electronic device may be performed through an electromagnetic induction method using a coil, a resonance method using resonance, or a radio wave radiation method in which electrical energy is converted into microwaves for transmission.

For example, the electromagnetic induction method using a coil can perform charging by wirelessly transmitting power from a wireless charging device (e.g., wireless charging transmitter) to an electronic device (e.g., wireless charging receiver) through a magnetic field induced by the coil.

In the electromagnetic induction method, charging efficiency is high when the centers of the coil of the wireless charging device and the coil of the electronic device are aligned, and the wireless charging device may include a plurality of coils to facilitate coil alignment.

When wireless charging of an electronic device is done using the electromagnetic induction method via one of the plurality of coils, charging speed may be slow and charging efficiency may be low.

Another problem may exist when a metallic object that is not a wireless charging receiver (e.g., smartphone) is placed on the wireless charging device. The wireless charging device may supply power to the metallic object through the coil causing it to overheat, which may in turn cause a fire.

According to an embodiment of the disclosure, there is provided a wireless charging device. The wireless charging device may include: a first inverter; a first switch electrically connected to the first inverter; a second inverter; a second switch electrically connected to the second inverter; a first group of coils connected to the first inverter through the first switch; a second group of coils connected to the second inverter through the second switch; and a processor operatively connected to the first inverter, the first switch, the second inverter, the second switch, the first group of coils, and the second group of coils. The processor may be configured to: transmit a first ping signal through the first group of coils and the second group of coils; sense a change in current, voltage, and/or frequency occurring in the first group of coils and the second group of coils in response to the first ping signal to detect that at least one electronic device is placed on or in proximity to the wireless charging device; select at least one coil from the first group of coils and at least one coil from the second group of coils at which the change in current, voltage, and/or frequency is sensed; transmit a second ping signal through the selected at least one coil of the first group of coils and the selected at least one coil of the second group of coils; and wirelessly transmit power to the at least one electronic device by using the selected at least one coil of the first group of coils and the selected at least one coil of the second group of coils.

According to an embodiment of the disclosure, there is provided a wireless charging method. The wireless charging method may include: transmitting, by a processor of the wireless charging device, a first ping signal through a first group of coils and a second group of coils; sensing a change in current, voltage, and/or frequency occurring in the first group of coils and the second group of coils in response to the first ping signal, and detecting that the at least one electronic device is placed on or in proximity to the wireless charging device; selecting at least one coil from the first group of coils and at least one coil from the second group of coils at which the change in current, voltage, and/or frequency is sensed; transmitting a second ping signal through the selected at least one coil of the first group of coils and the selected at least one coil of the second group of coils; and wirelessly transmitting power to the at least one electronic device by using the selected at least one coil of the first group of coils and the selected at least one coil of the second group of coils.

Additional aspects will be set forth in part in the description which follows and, in part, will be apparent from the description, or may be learned by practice of the presented embodiments.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIG. 6B depicts operations for selecting coils and charging using the selected coils when the electronic device is placed on the wireless charging device according to an embodiment of the disclosure;

DETAILED DESCRIPTION

One or more embodiments of the instant disclosure may provide a wireless charging device including groups of coils, and a method for charging an electronic device by selecting some of the plurality of coils included in the wireless charging device.

According to one or more embodiments of the disclosure, some of the plurality of coils included in the wireless charging device (e.g., wireless charging transmitter) may be selected by using a first ping signal transmitted and received between the wireless charging device and an electronic device (e.g., wireless charging receiver), and the electronic device may be charged quickly and safely through the selected coils while transmitting a second ping signal.

According to one or more embodiments of the disclosure, some of the plurality of coils included in the wireless charging device (e.g., wireless charging transmitter) may be selected by using a first ping signal transmitted and received between the wireless charging device and an electronic device (e.g., wireless charging receiver), and a plurality of power signals may be output through the selected coils so as to charge one or more electronic devices.

Hereinafter, certain embodiments of the disclosure will be described in detail with reference to the accompanying drawings.

Figure 1:
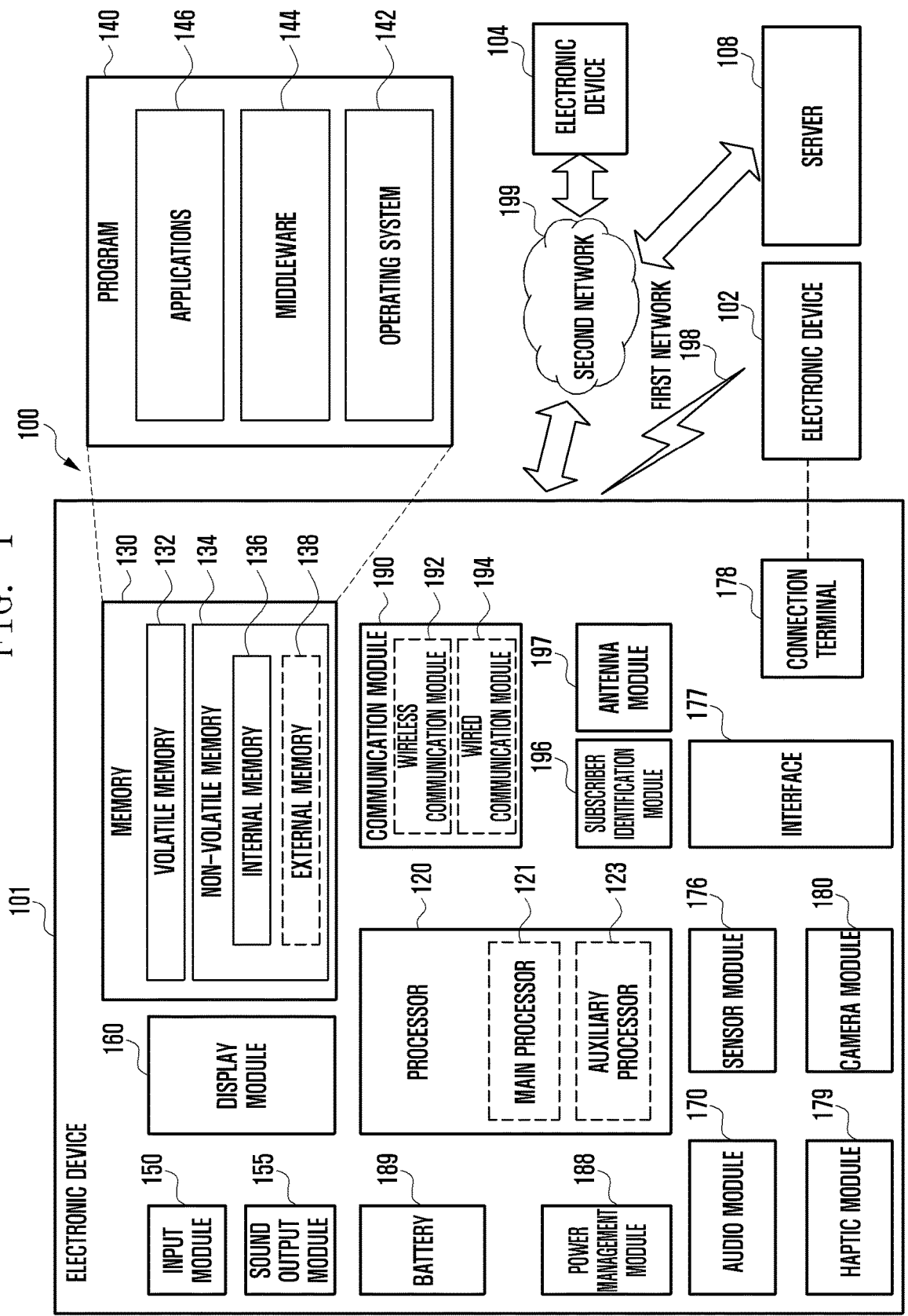
FIG. 1 is a block diagram of an electronic device in a network environment according to various embodiments of the disclosure.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit/receive a signal or power to/from an external entity (e.g., an external electronic device). According to some embodiments, the antenna module 197 may be formed of a conductor or a conductive pattern and may further include any other component (e.g., RFIC). According to an embodiment, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
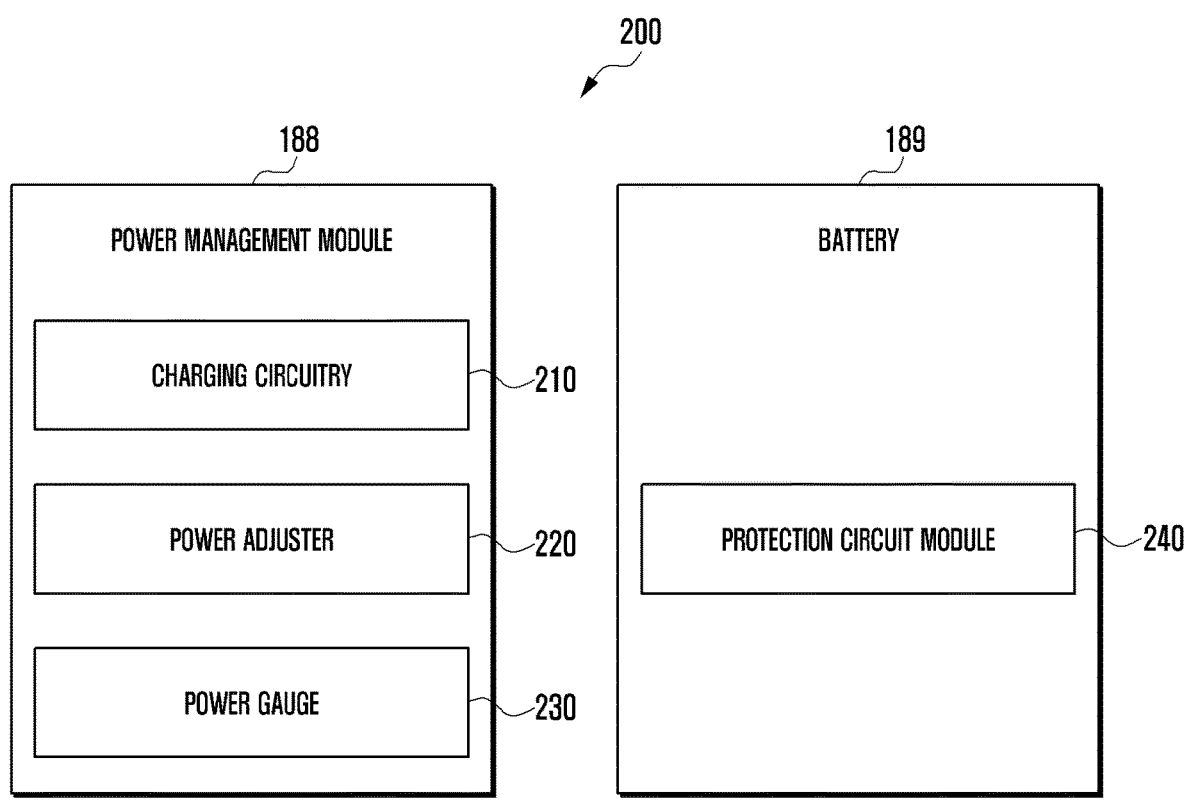
FIG. 2 is a block diagram of a power management module and a battery according to various embodiments of the disclosure.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to certain embodiments may be one of certain types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3A:
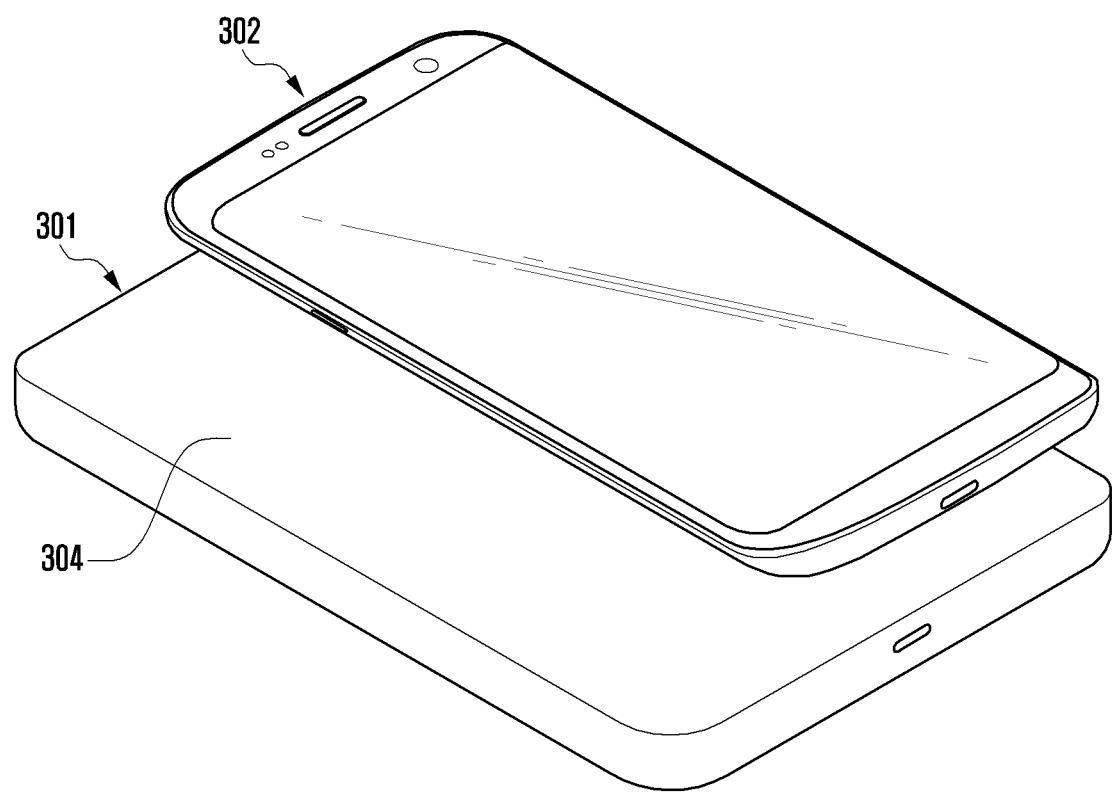
FIG. 3A is a schematic illustration where a wireless charging device (e.g., wireless charging transmitter) charges an electronic device (e.g., wireless charging receiver) according to an embodiment of the disclosure.

FIG. 3A is a schematic illustration where a wireless charging device charges an electronic device according to an embodiment of the disclosure.

According to an embodiment of the disclosure, with reference to FIG. 3A, the wireless charging device 301 (e.g., wireless charging transmitter) may wirelessly transmit power to charge the electronic device 302 (e.g., wireless charging receiver).

In an embodiment, when the battery (e.g., battery 189 in FIG. 1) of the electronic device 302 is in a discharged state or has remaining power level less than a specified level, the wireless charging device 301 may wirelessly transmit power to charge the battery 189 of the electronic device 302.

In an embodiment, the electronic device 302 of FIG. 3A may be the electronic device 101 shown in FIG. 1. The electronic device 302 may be a smartphone (as illustrated), a wearable device (e.g., watch), or a wireless earphone. The wireless charging device 301 may be identical (i.e. another electronic device 302) or similar to the electronic device 302. The wireless charging device 301 may be implemented with at least one of the electronic devices 101, 102 and 104 shown in FIG. 1. The wireless charging device 301 may be composed of one or more components comparable to those of the electronic device 101 shown in FIG. 1.

In an embodiment, while waiting to charge the electronic device 302, the wireless charging device 301 may detect that the electronic device 302 is placed on (e.g., adjacent to or in contact with) the housing 304. For example, the wireless charging device 301 may transmit a first ping signal (e.g., an analog ping signal, a Q ping signal, or a digital ping signal) to the electronic device 302 to check whether the electronic device 302 is adjacent to or in contact with the wireless charging device 301. In response to the first ping signal from the wireless charging device 301, the electronic device 302 may transmit a feedback signal (e.g., response signal, identification information, configuration information, and/or signal strength packet (SSP) signal) to the wireless charging device 301. The Q ping signal is a type of analog ping signal, and may be used to identify the degree of matching in the resonance point of the coil by detecting change in a signal applied to the coil of the wireless charging device 301 (e.g., changes in current, voltage, and/or frequency).

In an embodiment, based on the first ping signal for determining whether the electronic device 302 is placed on the housing 304, the wireless charging device 301 may determine whether an object (e.g., metal) is placed on the housing 304. For example, the wireless charging device 301 may identify a change in electrical energy (e.g., current or voltage) measured when the first ping signal is transmitted, and may determine whether the electronic device 302 is placed (e.g., present) based on the identified change in electrical energy. Upon determining that the electronic device 302 is present, the wireless charging device 301 may adjust at least some of a plurality of parameters related to the first ping signal.

In an embodiment, a guide (e.g., indicator) for the location (e.g., coil location or chargeable location) on which the electronic device 302 is to be placed may be indicated on the upper portion of the housing 304 of the wireless charging device 301.

Figure 3B:
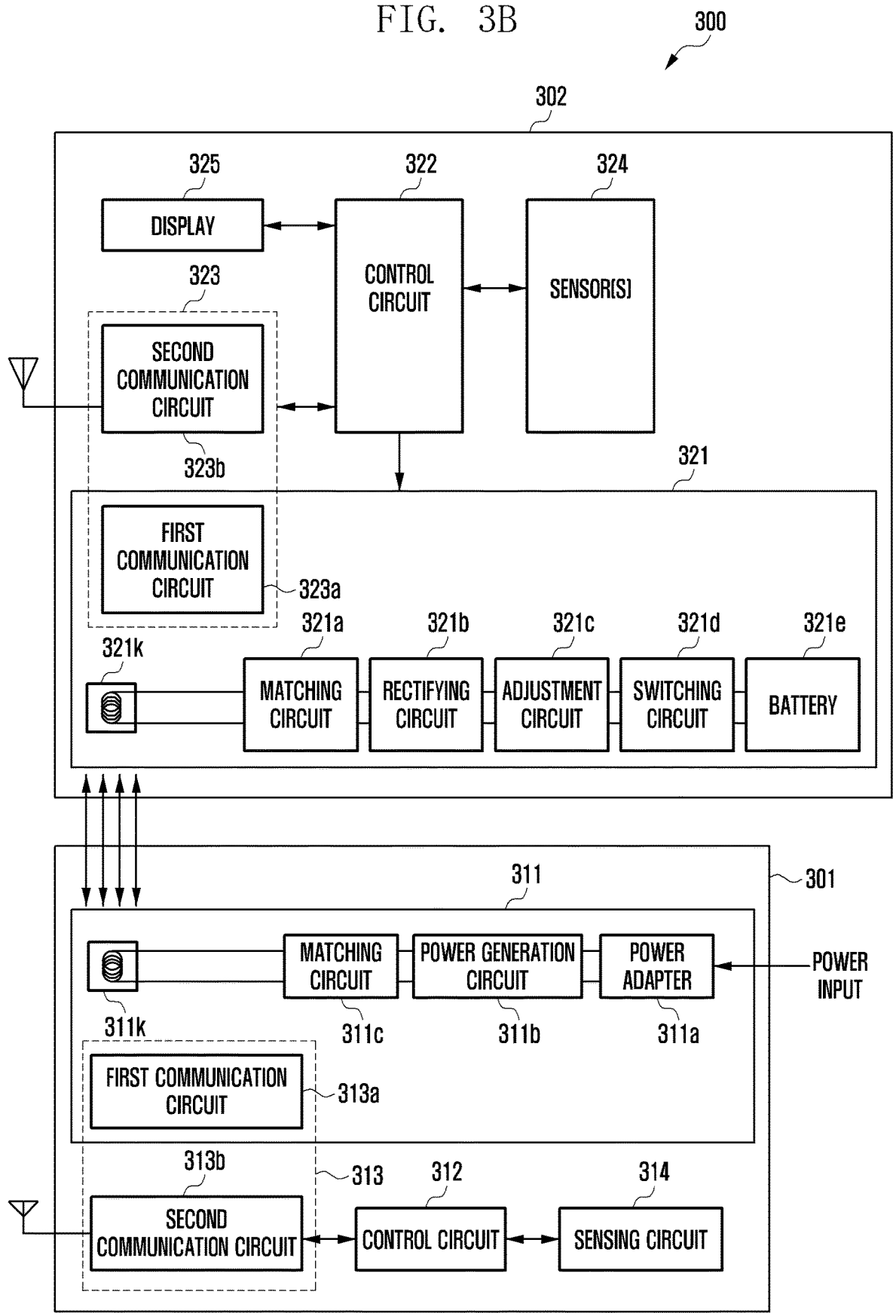
FIG. 3B is a schematic illustration of a wireless charging environment of the wireless charging device and the electronic device according to an embodiment of the disclosure.

FIG. 3B is a schematic illustration of a wireless charging environment 300 of the wireless charging device and the electronic device according to an embodiment of the disclosure.

In an embodiment, the wireless charging device 301 (e.g., wireless charging transmitter) of FIG. 3B may correspond to the wireless charging device 301 shown in FIG. 3A. The electronic device 302 (e.g., wireless charging receiver) of FIG. 3B may correspond to the electronic device 101 in FIG. 1 and/or the electronic device 302 in FIG. 3A.

In an embodiment, when the electronic device 302 is placed on the housing 304, the wireless charging device 301 may wirelessly transmit power to charge the battery 321e of the electronic device 302.

In an embodiment, the wireless charging device 301 may include a power transmitter 311, a control circuit 312, a communication circuit 313 and/or a sensing circuit 314.

In one embodiment, the power transmitter 311 may receive power from an external power source (e.g., commercial power source, auxiliary battery device, laptop computer, desktop computer, or smartphone).

In an embodiment, the power transmitter 311 may include a power adapter 311a, a power generation circuit 311b, a matching circuit 311c, and a power transmission coil 311k.

In one embodiment, the power adapter 311a may convert the voltage of power input from an external power source (e.g., travel adapter (TA)). The power generation circuit 311b may generate power required for power transmission from the converted voltage. The matching circuit 311c may maximize efficiency between the power transmission coil 311k and the power reception coil 321k of the electronic device 302.

In an embodiment, when wireless transmitting power to a plurality of electronic devices 302, the power transmission unit 311 may include plural instances for at least one of the power adapter 311a, the power generation circuit 311b, the matching circuit 311c, or the power transmission coil 311k.

In one embodiment, the power transmission coil 311k may include a plurality of coils grouped on the same layer and/or different layers. The wireless charging device 301 may select some of the plurality of coils disposed on the same layer and/or different layers to charge the electronic device 302.

In one embodiment, the control circuit 312 may control the overall operation of the wireless charging device 301 to transmit power. The control circuit 312 may be operatively connected with the power transmitter 311, the communication circuit 313, and the sensing circuit 314. The control circuit 312 may generate various messages required for wireless power transmission and transmit them to the communication circuit 313. Based on information received from the electronic device 302 (e.g., wireless charging receiver) through the communication circuit 313, the control circuit 312 may calculate the power or the amount of power to be transmitted to the electronic device 302. The control circuit 312 may control the power transmitter 311 to transmit the calculated amount of power to the electronic device 302 through the power transmission coil 311k.

In one embodiment, the communication circuit 313 (e.g., communication module 190 in FIG. 1) may include a first communication circuit 313a and/or a second communication circuit 313b. The first communication circuit 313a may communicate with a first communication circuit 323a of the electronic device 302 by using a frequency identical or close to the frequency used by the power transmission coil 311k for wireless power transmission (e.g., in-band communication using the power transmission coil 311k to transmit a power signal or a communication signal). The second communication circuit 313b may communicate with a second communication circuit 323b of the electronic device 302 by using a frequency different from the frequency used by the power transmission coil 311k for wireless power transmission (e.g., out-band communication using the antenna module 197 in FIG. 1 to transmit a communication signal). The second communication circuit 313b may use at least one of, for example, Bluetooth, Bluetooth low energy, Wi-Fi, or near field communication to receive information on the charge state of the electronic device 302 (e.g., rectified voltage (Vrec), current flowing through the rectifying circuit (Iout), various packets, or messages) from the second communication circuit 323b of the electronic device 302.

In one embodiment, the sensing circuit 314 (e.g., sensor module 176 in FIG. 1) may include at least one sensor, and may use the at least one sensor to detect at least one state of the wireless charging device 301. For example, the sensing circuit 314 may include a temperature sensor, a motion sensor, a proximity sensor, and/or a current (or voltage) sensor.

In one embodiment, the temperature sensor may sense a temperature-related state of the wireless charging device 301. The motion sensor may sense a motion-related state of the wireless charging device 301. The proximity sensor may detect a specific object (e.g., electronic device 302 or metallic object other than the electronic device 302) in proximity and/or contact with the upper portion of the housing 304 of the wireless charging device 301. The current (or voltage) sensor may sense a state of the output signal (e.g., magnitude of at least one of current, voltage, or power) of the wireless charging device 301. The current (or voltage) sensor may measure a signal of the power transmitter 311. For example, the current (or voltage) sensor may measure a signal of at least a portion of the matching circuit 311c and the power generation circuit 311b. The current (or voltage) sensor may include a circuit to measure a signal of the front end of the power transmission coil 311k.

In an embodiment, the sensing circuit 314 may detect an electronic device 302 (e.g., wireless charging receiver) or foreign object (e.g., metal) other than the electronic device 302 placed on the housing 304 of the wireless charging device 301 (e.g., wireless charging transmitter).

In an embodiment, when the wireless charging device 301 is a mobile terminal (e.g., electronic device 101 in FIG. 1 or electronic device 302 in FIG. 3A), the wireless charging device 301 may include a display (e.g., display device 160 in FIG. 1). The wireless charging device 301 may use the display to output various information related to wireless charging (e.g., information regarding the charging state of the wireless charging device 301, the charging state of the electronic device 302, detection of the electronic device 302, or detection of a foreign object (e.g., metal)).

In an embodiment of the disclosure, with reference to FIG. 3B, when the electronic device 302 (e.g., wireless charging receiver) is placed on the housing 304 of the wireless charging device 301, it may wirelessly receive power from the wireless charging device 301.

In an embodiment, the electronic device 302 may include a power receiver 321, a control circuit 322, a communication circuit 323, at least one sensor 324, and/or a display 325. In the description of the electronic device 302, descriptions of components corresponding to those of the wireless charging device 301 may be omitted.

In one embodiment, the power receiver 321 may include a power reception coil 321k for wirelessly receiving power from the wireless charging device 301 (e.g., power transmission coil 311k), a matching circuit 321a, a rectifying circuit 321b for rectifying the received AC power into DC, an adjustment circuit 321c for adjusting the charging voltage, a switching circuit 321d, and/or a battery 321e (e.g., battery 189 in FIG. 1).

In one embodiment, the control circuit 322 may control the overall operation of the electronic device 302 for wireless power reception (or wireless charging). The control circuit 322 may generate various messages related to wireless charging and transmit them to the communication circuit 323.

In one embodiment, the communication circuit 323 (e.g., communication module 190 in FIG. 1) may include a first communication circuit 323a and/or a second communication circuit 323b. The first communication circuit 323a may use the power receiving coil 321k to communicate with the first communication circuit 313a of the wireless charging device

301. The second communication circuit 323b may use at least one of Bluetooth, Bluetooth low energy, Wi-Fi, or near field communication to communicate with the second communication circuit 313b of the wireless charging device 301.

In one embodiment, the sensor 324 (e.g., sensor module 176 in FIG. 1) may include at least one of a current (or voltage) sensor, a temperature sensor, a proximity sensor, an illuminance sensor, or an acceleration sensor.

In one embodiment, the display 325 (e.g., display device 160 in FIG. 1) may be used to display various types of information related to wireless power reception (or wireless charging).

Figure 3C:
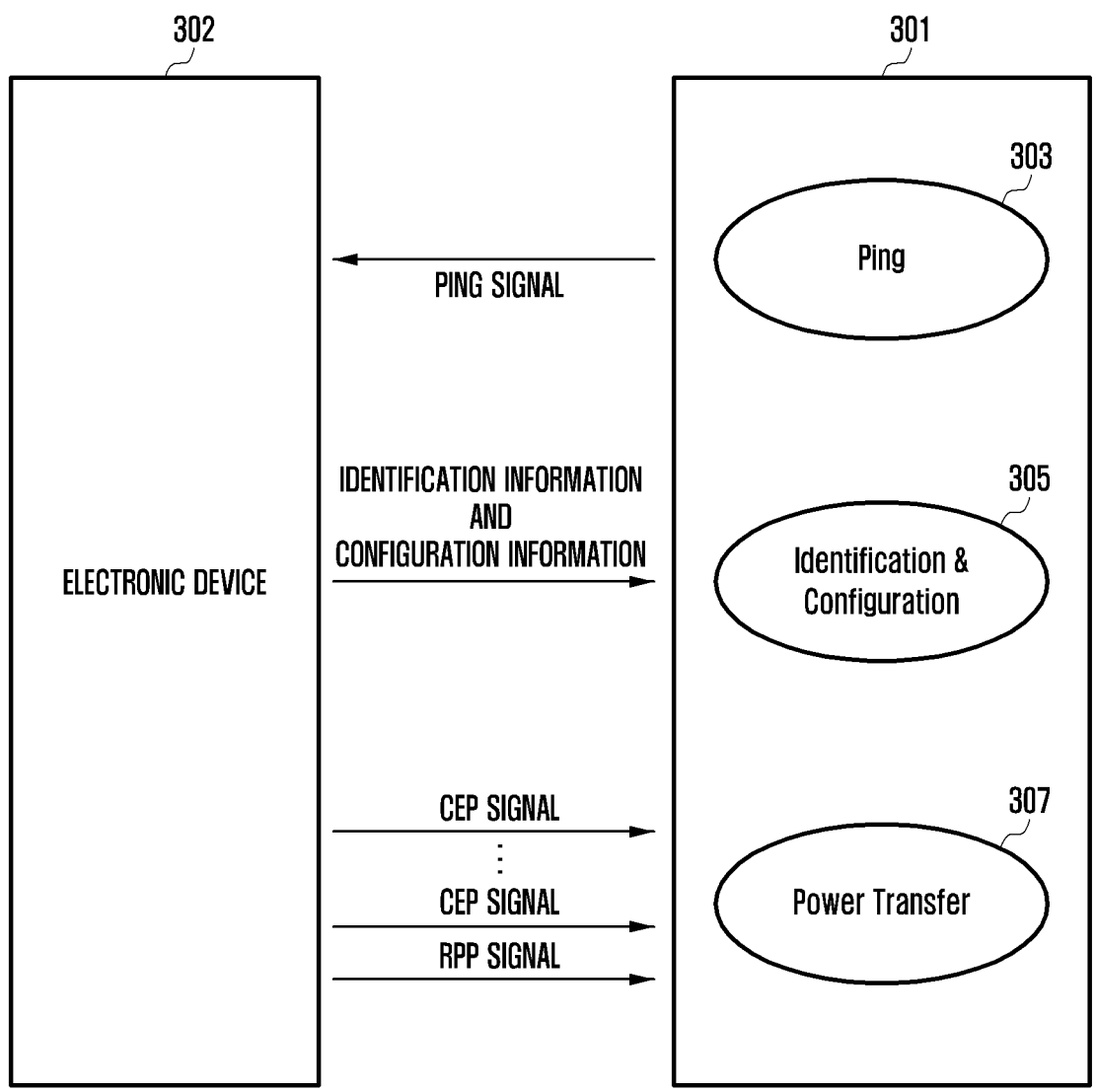
FIG. 3C is a diagram illustrating operations of the wireless charging device to detect an object such as an electronic device according to an embodiment of the disclosure.

FIG. 3C is a diagram illustrating operations of the wireless charging device to detect an object such as an electronic device according to an embodiment of the disclosure.

According to an embodiment of the disclosure, with reference to FIG. 3C, the wireless charging device 301 (e.g., wireless charging transmitter) may perform a function (e.g., transmission or Tx function) of wirelessly transmitting power to the electronic device 302 (e.g., wireless charging receiver).

In an embodiment, for example, when the electronic device 302 is placed on the upper portion of the housing 304, the wireless charging device 301 may detect and authenticate the electronic device 302 and wirelessly transmit power to the electronic device 302.

In one embodiment, the wireless charging device 301 may perform ping operation 303, identification and configuration operation 305, and power transfer operation 307. The wireless charging device 301 may utilize ping operation 303, identification and configuration operation 305, and power transfer operation 307 to transmit and receive signal or data.

In one embodiment, the control circuit (e.g., control circuit 312 in FIG. 3B) of the wireless charging device 301 may use ping operation 303 to transmit a signal (e.g., ping signal) for detecting the electronic device 302 within a preset range at preset time intervals. For example, the control circuit 312 of the wireless charging device 301 may transmit a first ping signal or a second ping signal to the electronic device 302. The transmission period of the first ping signal may be shorter than that of the second ping signal. The first ping signal may have a transmission period of about 0.1 to 10 ms. The second ping signal may have a transmission period of about 65 to 70 ms. The first ping signal may include an analog ping signal or a Q ping signal. The second ping signal may include a digital ping signal. The transmission period of the first ping signal and the transmission period of the second ping signal are illustrative, and may be changed according to settings of the wireless charging device 301 and/or the user.

In one embodiment, the wireless charging device 301 may receive a feedback signal (e.g., response signal, identification information, configuration information, and/or SSP signal) from the electronic device 302 in response to the first ping signal or the second ping signal and may detect whether the electronic device 302 is present.

In an embodiment, the wireless charging device 301 may use an analog ping signal serving as a first ping signal to check whether a specific object (e.g., electronic device 302 or metallic object other than the electronic device) is placed on the upper portion of the housing 304. The wireless charging device 301 may detect, for example, a change in current at the power generation circuit 311b which may vary according to the type and location of the object.

In an embodiment, the wireless charging device 301 may use a Q ping signal serving as a first ping signal to check whether a specific object (e.g., electronic device 302 or metallic object other than the electronic device) is placed on the upper portion of the housing 304. The wireless charging device 301 may detect, for example, changes in attenuation coefficient (e.g. Q value) and natural frequency at the power transmission coil 311k which may vary according to the type and location of the object.

In an embodiment, upon determining that a specific object (e.g., electronic device 302) is placed on the upper portion of the housing 304 using the first ping signal, the wireless charging device 301 may check the type and location of the object placed on the upper portion of the housing 304 by using a digital ping signal serving as a second ping signal. For example, when the wireless charging device 301 transmits a digital ping signal serving as a second ping signal to the electronic device 302, a voltage higher than a given value may be induced across the rectifying circuit 321b of the electronic device 302, and a signal strength packet (SSP) signal indicating the magnitude of the induced voltage (e.g., information on the voltage value) may be transmitted to the wireless charging device 301. The wireless charging device 301 may identify the type and location of the electronic device 302 placed on the housing 304 based on the received SSP signal.

In one embodiment, the control circuit 312 of the wireless charging device 301 may configure a plurality of parameters related to transmission of the first ping signal or the second ping signal at ping operation 303. For example, the control circuit 312 of the wireless charging device 301 may configure a plurality of parameters related to the frequency of the first ping signal or the second ping signal, the voltage applied to the power transmission circuit (e.g., power transmitter 311 or power transmission coil 311k in FIG. 3B) to transmit the first ping signal or the second ping signal, the transmission period of the first ping signal or the second ping signal, etc. The plurality of parameters may be configured by the manufacturer of the wireless charging device 301 and be given as default values at the initial configuration of the wireless charging device 301.

In one embodiment, the control circuit 312 of the wireless charging device 301 may determine whether a specific object (e.g., electronic device 302) is present on the housing 304 of the wireless charging device 301 at ping operation 303. The control circuit 312 of the wireless charging device 301 may transmit a ping signal based on the plurality of parameters related to transmission of the first ping signal or the second ping signal during an interval for ping operation 303 (otherwise may be known as the wireless charging standby state), and may check the electrical energy (e.g., at least one of current or voltage) measured at the power transmitter 311 (or, power transmission coil 311k) in response to transmission of the ping signal.

In one embodiment, the control circuit 312 of the wireless charging device 301 may check the relationship between the voltage measured across the power transmitter 311 (or, power transmission coil 311k) and a specified threshold voltage, or the relationship between the current measured at the power transmitter 311 (or, power transmission coil 311k) and a specified threshold current in response to transmission of the first ping signal or the second ping signal. The control circuit 312 of the wireless charging device 301 may then determine whether a specific object is present on the wireless charging device 301 based on the result of the check.

In one embodiment, the control circuit 312 of the wireless charging device 301 may sense the state of an object present on the wireless charging device 301 (e.g., type, size or arrangement of the object) or change in the state of the object based on change in electrical energy (e.g., at least one of current or voltage) measured at the power transmitter 311 (or, power transmission coil 311k) in response to transmission of the first ping signal or the second ping signal.

In one embodiment, upon determining that a specific object (e.g., electronic device 302 or metallic object other than the electronic device) is placed on the housing 304 of the wireless charging device 301, the control circuit 312 of the wireless charging device 301 may change or adjust at least some of the plurality of parameters related to transmission of the first ping signal or the second ping signal so as to suppress the noise caused by the object (e.g., vibration of the object and/or noise in the audible frequency band due to the vibration), heat generation of the object, or deterioration of the wireless charging device 301 caused by the object (e.g., heat generation of the wireless charging device 301 due to induction heating from the object). The control circuit 312 of the wireless charging device 301 may output a specified notification (e.g., light, vibration, or sound) to provide a notification regarding the presence of the specific object.

In one embodiment, upon detecting the electronic device 302 (e.g., wireless charging receiver), at identification and configuration operation 305, the control circuit 312 of the wireless charging device 301 may receive identification information and configuration information of the electronic device 302.

In an embodiment, the identification information may include at least one piece of information capable of identifying the electronic device 302 (e.g., wireless communication ID of the electronic device 302). If the identification information matches information previously stored in the memory (e.g., memory 130 in FIG. 1) (e.g., wireless communication ID of the electronic device 302 allowed to wirelessly share power with the wireless charging device 301), the control circuit 312 of the wireless charging device 301 may determine the detected electronic device 302 to be a valid device. The configuration information may include various types of information required for the electronic device 302 to wirelessly receive power from the wireless charging device 301.

In one embodiment, when the electronic device 302 is identified or selected based on the identification information and configuration information, at power transfer operation 307, the control circuit 312 of the wireless charging device 301 may wirelessly transmit power to the electronic device 302. At power transfer operation 307, the control circuit 312 of the wireless charging device 301 may receive, from the electronic device 302, control error packet (CEP) signal including notification information on the power (or the amount of power) required by the electronic device 302 for charging or received power packet (RPP) signal including magnitude information on the power (or the amount of power) received by the electronic device 302. The control circuit 312 of the wireless charging device 301 may adjust the power transmitted wirelessly to the electronic device 302 based on the CEP signal and/or the RPP signal.

In one embodiment, the electronic device 302 may transmit at least one CEP signal and RPP signal at specified periods or when a specific event (e.g., state change of the electronic device 302) occurs. Alternatively, the CEP signal and the RRP signal may be transmitted at different periods.

Figure 4:
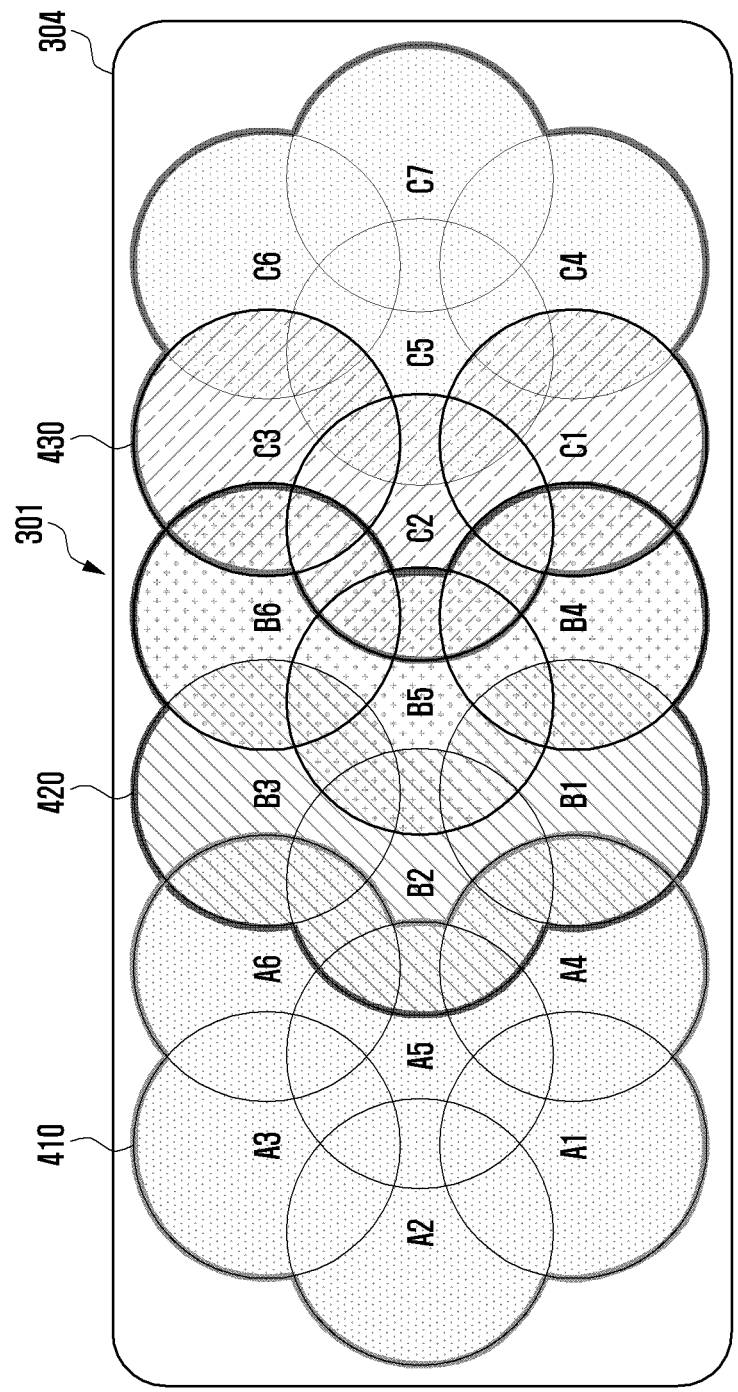
FIG. 4 illustrates a configuration of a plurality of coils included in the wireless charging device according to an embodiment of the disclosure.

FIG. 4 illustrates a configuration of a plurality of coils included in the wireless charging device according to an embodiment of the disclosure.

In an embodiment of the disclosure, with reference to FIG. 4, the wireless charging device 301 (e.g., wireless charging transmitter) may include first group of coils 410, second group of coils 420 and/or third group of coils 430 inside the housing 304.

In an embodiment, the first group of coils 410, the second group of coils 420, and the third group of coils 430 may be part of the power transmission coil 311k shown in FIG. 3B.

In an embodiment, the first group of coils 410, the second group of coils 420, and the third group of coils 430 may be arranged on the same layer and/or different layers.

In an embodiment, the first group of coils 410, the second group of coils 420, and the third group of coils 430 may each be configured in one layer. Thus, the first group of coils 410, the second group of coils 420, and the third group of coils 430 may be configured as plural layers instead of a single layer.

In an embodiment, the first group of coils 410 may include a plurality of coils. For example, the first group of coils 410 may include at least one coil among coil A1, coil A2, coil A3, coil A4, coil A5, and coil A6. Coil A1, coil A2, coil A3, coil A4, coil A5, and coil A6 may be disposed on the same layer or may be disposed on different layers.

In an embodiment, the second group of coils 420 may include a plurality of coils. For example, the second group of coils 420 may include at least one coil among coil B1, coil B2, coil B3, coil B4, coil B5, and coil B6. Coil B1, coil B2, coil B3, coil B4, coil B5, and coil B6 may be disposed on the same layer or may be disposed on different layers.

In an embodiment, the third group of coils 430 may include a plurality of coils. For example, the third group of coils 430 may include at least one coil among coil C1, coil C2, coil C3, coil C4, coil C5, coil C6, and coil C7. Coil C1, coil C2, coil C3, coil C4, coil C5, coil C6, and coil C7 may be disposed on the same layer or may be disposed on different layers.

In an embodiment, the layers corresponding respectively to the first group of coils 410 (e.g., coil A1, coil A2, coil A3, coil A4, coil A5, and coil A6), the second group of coils 420 (e.g., coil B1, coil B2, coil B3, coil B4, coil B5, and coil B6), and the third group of coils 430 (e.g., coil C1, coil C2, coil C3, coil C4, coil C5, coil C6, and coil C7) may be arranged so that the charging regions of the three groups of coils overlap one another.

In an embodiment, the plurality of coils belonging to the first group of coils 410 (e.g., coil A1, coil A2, coil A3, coil A4, coil A5, and coil A6), the plurality of coils belonging to the second group of coils 420 (e.g., coil B1, coil B2, coil B3, coil B4, coil B5, and coil B6), and the plurality of coils belonging to the third group of coils 430 (e.g., coil C1, coil C2, coil C3, coil C4, coil C5, coil C6, and coil C7) may be arranged in a staggered manner without coincident central axes.

In an embodiment, the plurality of groups of coils (e.g., first group of coils 410, second group of coils 420, third group of coils 430, and plurality of coils belonging to each group (e.g., coil A1 to coil C7)) included in the wireless charging device 301 shown in FIG. 4 are illustrative, and the wireless charging device 301 may include more or fewer coil groups and/or coils as those shown in FIG. 4.

Figure 5:
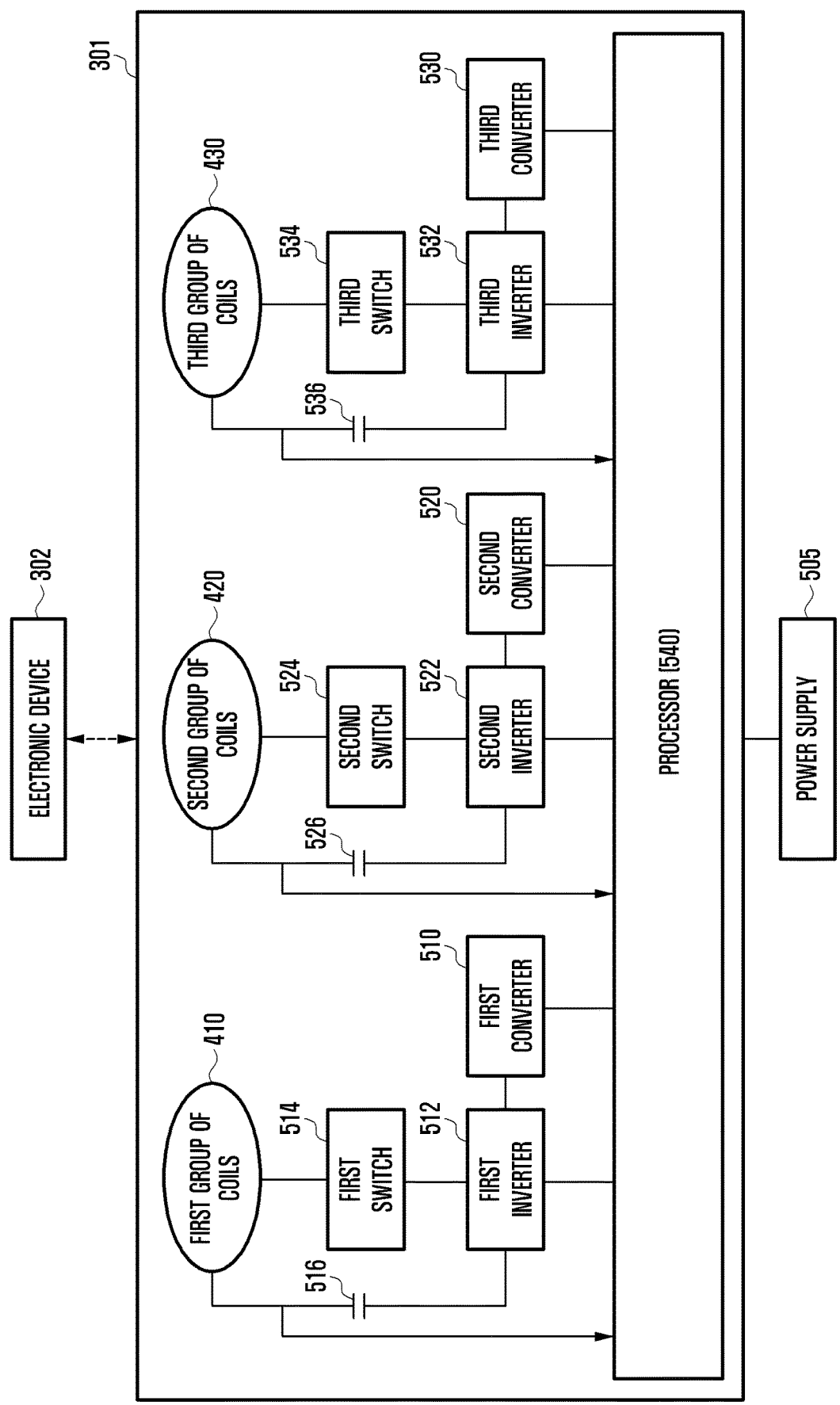
FIG. 5 is a schematic block diagram of the wireless charging device according to an embodiment of the disclosure.

FIG. 5 is a schematic block diagram of the wireless charging device according to an embodiment of the disclosure.

In an embodiment, the wireless charging device 301 may include a first converter 510, a first inverter 512, a first switch 514, first group of coils 410, a first resonant element 516, a second converter 520, a second inverter 522, a second switch 524, second group of coils 420, a second resonant element 526, a third converter 530, a third inverter 532, a third switch 534, third group of coils 430, a third resonant element 536, and/or a processor 540. The processor 540 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In the description on FIG. 5, the first converter 510, the first inverter 512, the first switch 514, the first group of coils 410, the first resonant element 516, the second converter 520, the second inverter 522, the second switch 524, the second group of coils 420, the second resonant element 526, the third converter 530, the third inverter 532, the third switch 534, the third group of coils 430, and the third resonant element 536 included in the wireless charging device 301 are illustrative, and additional components may be included according to other embodiments.

In an embodiment of the disclosure, with reference to FIG. 5, the wireless charging device 301 may use a power supply 505 to receive power from the outside.

In an embodiment, the wireless charging device 301 may be the wireless charging device 301 shown in FIGS. 3A, 3B, 3C and/or 4.

In an embodiment, the power supply 505 may supply power to the wireless charging device 301 by using a travel adapter (TA), a battery, or USB. The power supply 505 may supply power by converting alternating current (AC) power into direct current (DC) power.

In one embodiment, the first converter 510 (e.g., power adapter 311a in FIG. 3B) may convert DC power input from the power supply 505 into a preset power. For example, the first converter 510 may convert the voltage so that the output voltage becomes about 5V.

In one embodiment, the first inverter 512 (e.g., power generation circuit 311b in FIG. 3B) may be electrically connected to the first converter 510. The first inverter 512 may convert the DC voltage output from the first converter 510 into an AC voltage.

In an embodiment, the first inverter 512 may include a preset amplifier (not shown). The first inverter 512 may amplify the signal input from the first converter 510.

In one embodiment, the first switch 514 may be electrically connected to the first inverter 512. The first switch 514 may form a contact point between the first inverter 512 and the first group of coils 410. The first switch 514 may connect the first inverter 512 to at least one of coil A1, coil A2, coil A3, coil A4, coil A5, or coil A6 belonging to the first group of coils 410 under the control of the processor 540. The first switch 514 may switch between on and off states under the control of the processor 540.

In one embodiment, the first group of coils 410 may be connected to the first inverter 512 through the first switch 514. The first group of coils 410 may include coil A1, coil A2, coil A3, coil A4, coil A5, and coil A6. At least one of coil A1, coil A2, coil A3, coil A4, coil A5, or coil A6 may be selectively connected to the first inverter 512 according to the control of the processor 540 and the on or off operation of the first switch 514. At least one of coil A1, coil A2, coil A3, coil A4, coil A5, or coil A6 may wirelessly transmit power to the electronic device 302 (e.g., wireless charging receiver) by forming electromagnetic fields generated from an AC signal input through the first inverter 512 under the control of the processor 540.

In one embodiment, the first resonant element 516 may be disposed between the first inverter 512 and the first group of coils 410. The first resonant element 516 may include a capacitor. The first resonant element 516 may maximize the efficiency of the first group of coils 410.

In one embodiment, the second converter 520 may convert DC power input from the power supply 505 into a preset power. For example, the second converter 520 may convert the voltage so that the output voltage becomes about 5V.

In one embodiment, the second inverter 522 (e.g., power generation circuit 311b in FIG. 3B) may be electrically connected to the second converter 520. The second inverter 522 may convert the DC voltage output from the second converter 520 into an AC voltage.

In an embodiment, the second inverter 522 may include a preset amplifier (not shown). The second inverter 522 may amplify the signal input from the second converter 520.

In one embodiment, the second switch 524 may be electrically connected to the second inverter 522. The second switch 524 may form a contact point between the second inverter 522 and the second group of coils 420. The second switch 524 may connect the second inverter 522 to at least one of coil B1, coil B2, coil B3, coil B4, coil B5, or coil B6 belonging to the second group of coils 420 under the control of the processor 540. The second switch 524 may switch between on and off states under the control of the processor 540.

In one embodiment, the second group of coils 420 may be connected to the second inverter 522 through the second switch 524. The second group of coils 420 may include coil B1, coil B2, coil B3, coil B4, coil B5, and coil B6. At least one of coil B1, coil B2, coil B3, coil B4, coil B5, or coil B6 may be selectively connected to the second inverter 522 according to the control of the processor 540 and the on or off operation of the second switch 524. At least one of coil B1, coil B2, coil B3, coil B4, coil B5, or coil B6 may wirelessly transmit power to the electronic device 302 (e.g., wireless charging receiver) by forming electromagnetic fields generated from an AC signal input through the second inverter 522 under the control of the processor 540.

In one embodiment, the second resonant element 526 may be disposed between the second inverter 522 and the second group of coils 420. The second resonant element 526 may include a capacitor. The second resonant element 526 may maximize the efficiency of the second group of coils 420.

In one embodiment, the third converter 530 may convert DC power input from the power supply 505 into a preset power. For example, the third converter 530 may convert the voltage so that the output voltage becomes about 5V.

In one embodiment, the third inverter 532 (e.g., power generation circuit 311b in FIG. 3B) may be electrically connected to the third converter 530. The third inverter 532 may convert the DC voltage output from the third converter 530 into an AC voltage.

In an embodiment, the third inverter 532 may include a preset amplifier (not shown). The third inverter 532 may amplify the signal input from the third converter 530.

In one embodiment, the third switch 534 may be electrically connected to the third inverter 532. The third switch 534 may form a contact point between the third inverter 532 and the third group of coils 430. The third switch 534 may connect the third inverter 532 to at least one of coil C1, coil C2, coil C3, coil C4, coil C5, coil C6, or coil C7 belonging to the third group of coils 430 under the control of the processor 540. The third switch 534 may switch between on and off states under the control of the processor 540.

In one embodiment, the third group of coils 430 may be connected to the third inverter 532 through the third switch 534. The third group of coils 430 may include coil C1, coil C2, coil C3, coil C4, coil C5, coil C6, and/or coil C7. At least one of coil C1, coil C2, coil C3, coil C4, coil C5, coil C6, or coil C7 may be selectively connected to the third inverter 532 according to the control of the processor 540 and the on or off operation of the third switch 534. At least one of coil C1, coil C2, coil C3, coil C4, coil C5, coil C6, or coil C7 may wirelessly transmit power to the electronic device 302 (e.g., wireless charging receiver) by forming electromagnetic fields generated from an AC signal input through the third inverter 532 under the control of the processor 540.

In one embodiment, the third resonant element 536 may be disposed between the third inverter 532 and the third group of coils 430. The third resonant element 536 may include a capacitor. The third resonant element 536 may maximize the efficiency of the third group of coils 430.

In one embodiment, the processor 540 (e.g., control circuit 312 in FIG. 3B) may be operatively connected to the first converter 510, the first inverter 512, the first switch 514, the first group of coils 410, the first resonant element 516, the second converter 520, the second inverter 522, the second switch 524, the second group of coils 420, the second resonant element 526, the third converter 530, the third inverter 532, the third switch 534, the third group of coils 430, and/or the third resonant element 536. The processor 540 may control the overall operation of the wireless charging device 301.

In an embodiment, when the electronic device 302 (e.g., wireless charging receiver) is placed on (e.g., adjacent to or in contact with) the housing (e.g., housing 304 in FIG. 3A or 4) of the wireless charging device 301 (e.g., wireless charging transmitter), the processor 540 may charge the electronic device 302 by using at least one of the first group of coils 410, the second group of coils 420, or the third group of coils 430.

In one embodiment, when the electronic device 302 (e.g., wireless charging receiver) is placed on the housing 304 of the wireless charging device 301 (e.g., wireless charging transmitter), the processor 540 may charge the electronic device 302 by using at least one of the first group of coils 410 (e.g., at least one of coil A1, coil A2, coil A3, coil A4, coil A5, or coil A6) and at least one of the second group of coils 420 (e.g., at least one of coil B1, coil B2, coil B3, coil B4, coil B5, or coil B6).

In an embodiment, the third group of coils 430 may include a plurality of coils. For example, the third group of coils 430 may include at least one coil among coil C1, coil C2, coil C3, coil C4, coil C5, coil C6, and coil C7. Coil C1, coil C2, coil C3, coil C4, coil C5, coil C6, and coil C7 may be disposed on the same layer or may be disposed on different layers.

In an embodiment, the plurality of coils belonging to the first group of coils 410 (e.g., coil A1, coil A2, coil A3, coil A4, coil A5, and coil A6), the plurality of coils belonging to the second group of coils 420 (e.g., coil B1, coil B2, coil B3, coil B4, coil B5, and coil B6), and the plurality of coils belonging to the third group of coils 430 (e.g., coil C1, coil C2, coil C3, coil C4, coil C5, coil C6, and coil C7) may be arranged such that the groups of coils overlap one another to charge the electronic device 302.

In an embodiment, when the electronic device 302 is placed on the housing 304 of the wireless charging device 301 (e.g., wireless charging transmitter), the processor 540 may charge the electronic device 302 by using at least one coil in the first group of coils 410, at least one coil in the second group of coils 420, and/or at least one coil in the third group of coils 430 (e.g., at least one of coil C1, coil C2, coil C3, coil C4, coil C5, coil C6, or coil C7).

In an embodiment, the processor 540 may generate various messages necessary for wirelessly transmitting power to the electronic device 302 (e.g., wireless charging receiver). The processor 540 may calculate the power or the amount of power to be transmitted to the electronic device 302.

In an embodiment, when the electronic device 302 is placed on the upper portion of the wireless charging device 301, the processor 540 may transmit a first ping signal and/or a second ping signal to the electronic device 302 separately through the first group of coils 410 (e.g., coil A1, coil A2, coil A3, coil A4, coil A5, and/or coil A6), the second group of coils 420 (e.g., coil B1, coil B2, coil B3, coil B4, coil B5, and/or coil B6), and the third group of coils 430 (e.g., coil C1, coil C2, coil C3, coil C4, coil C5, coil C6, and/or coil C7), and may identify the type and location of the electronic device 302 based on the result of a feedback signal (e.g., signal strength packet (SSP)) received from the electronic device 302 separately through the first group of coils 410, the second group of coils 420, and the third group of coils 430.

In one embodiment, to detect whether the electronic device 302 is placed on the housing 304, the processor 540 of the wireless charging device 301, the processor 540 may measure the amount of change in impedance of each of the first group of coils 410, the second group of coils 420, and/or the third group of coils 430 during a specified period or according to a specified pattern.

In an embodiment, the processor 540 of the wireless charging device 301 may periodically transmit a first ping signal or a second ping signal to the electronic device 302 at a specified strength and time. The signal strength packet (SSP) sent by the electronic device 302 in response to the first or second ping signal may include a preset signal containing information on voltage, current, or frequency strength.

In an embodiment, the first ping signal may have a transmission period of about 0.1 to 10 ms. The second ping signal may have a transmission period of about 65 to 70 ms. The first ping signal may include an analog ping signal or a Q ping signal. The second ping signal may include a digital ping signal.

In one embodiment, the processor 540 of the wireless charging device 301 may receive a feedback signal (e.g., response signal, identification information, configuration information, and/or SSP signal) from the electronic device 302 in response to the first ping signal or the second ping signal, and may detect the presence of the electronic device 302.

In an embodiment, the wireless charging device 301 may use an analog ping signal serving as the first ping signal to check whether a specific object (e.g., electronic device 302 or metallic object other than the electronic device) is placed on the upper portion of the housing 304. The wireless charging device 301 may detect, for example, a change in current at one of the first inverter 512, the second inverter 522 and the third inverter 532 which may vary according to the type and location of the object.

In an embodiment, the wireless charging device 301 may use a Q ping signal serving as the first ping signal to check whether a specific object (e.g., electronic device 302 or metallic object other than the electronic device) is placed on the upper portion of the housing 304. The wireless charging device 301 may detect, for example, changes in attenuation coefficient (e.g. Q value) (or, coupling coefficient) and natural frequency of at least one of the first group of coils 410, the second group of coils 420, or the third group of coils 430 which may vary according to the type and location of the object.

In an embodiment, upon determining that a specific object (e.g., electronic device 302) is placed on the upper portion of the housing 304 using the first ping signal, the wireless charging device 301 may check the type and location of the object placed on the upper portion of the housing 304 by using a digital ping signal serving as a second ping signal. For example, when the wireless charging device 301 transmits a digital ping signal serving as a second ping signal to the electronic device 302, a voltage higher than a given value may be induced across the rectifying circuit 321b of the electronic device 302, and a signal strength packet (SSP) signal indicating the magnitude of the induced voltage (e.g., information on the voltage value) may be transmitted to the wireless charging device 301. The wireless charging device 301 may identify the type and location of the electronic device 302 placed on the housing 304 based on the received SSP signal.

In an embodiment, based on the feedback signal (e.g., SSP signal) returned from the electronic device 302, the processor 540 of the wireless charging device 301 may selectively turn on the first switch 514 connected to the first inverter 512, the second switch 524 connected to the second inverter 522, and/or the third switch 534 connected to the third inverter 532, and may select individual coils to be operated for wireless charging from among the first group of coils 410, the second group of coils 420, and the third group of coils 430.

In an embodiment, upon identifying the type and location of the electronic device 302 placed on the upper portion of the housing 304 through the first ping signal, the processor 540 of the wireless charging device 301 may select coils corresponding to the location where the electronic device 302 is placed, and may charge the electronic device 302 by using the selected coils while transmitting a second ping signal to the electronic device 302 through the selected coils.

In an embodiment, the processor 540 of the wireless charging device 301 may select a coil having the largest SSP value as an operating coil based on the feedback signal (e.g., signal strength packet (SSP)). The processor 540 may additionally select another operating coil in consideration of the ratio of SSP values of the remaining coils with respect to the largest SSP value.

In an embodiment, the processor 540 may determine at least one coil to be operated from among the first group of coils 410, the second group of coils 420, and the third group of coils 430, and determine operating voltages of the first inverter 512, the second inverter 522, and the third inverter 532 connected respectively through the first switch 514, the second switch 524, and the third switch 534.

In an embodiment, the processor 540 of the wireless charging device 301 may control pulse width modulation (PWM) signals of the first inverter 512, the second inverter 522, and the third inverter 532 for synchronized operation or independent operations. The processor 540 may operate at least one coil in the first group of coils 410, at least one coil in the second group of coils 420, and at least one coil in the third group of coils 430 in the same phase or in different phases, and operate the first inverter 512, the second inverter 522, and the third inverter 532 connected respectively through the first switch 514, the second switch 524, and the third switch 534 in the same phase or in different phases correspondingly.

In an embodiment, the processor 540 of the wireless charging device 301 may control the first inverter 512, the second inverter 522, and/or the third inverter 532 to generate signals of different frequency bands. The processor 540 may control the first group of coils 410, the second group of coils 420, and/or the third group of coils 430 so as to wirelessly transmit different powers separately to the electronic device 302.

In an embodiment, the processor 540 of the wireless charging device 301 may perform a control operation so that the same voltage is supplied to the first inverter 512, the second inverter 522, and the third inverter 532. The processor 540 of the wireless charging device 301 may perform a control operation so that different voltages are supplied to the first inverter 512, the second inverter 522, and the third inverter 532. Based on the current values supplied respectively to the first inverter 512, the second inverter 522, and the third inverter 532, the processor 540 may reset the ratio or offset between voltages supplied respectively to the inverters.

In an embodiment, based on the feedback signal (e.g., signal strength packet (SSP)), the processor 540 of the wireless charging device 301 may set different parameters (e.g., frequency, phase, and/or voltage) applied to the first group of coils 410, the second group of coils 420, and the third group of coils 430 respectively through the first inverter 512, the second inverter 522, and the third inverter 532.

In an embodiment, the first group of coils 410 (e.g., coil A1, coil A2, coil A3, coil A4, coil A5, or coil A6), the second group of coils 420 (e.g., coil B1, coil B2, coil B3, coil B4, coil B5, or coil B6), or the third group of coils 430 (e.g., coil C1, coil C2, coil C3, coil C4, coil C5, coil C6, or coil C7) may have the same characteristics or may have at least one different characteristic.

The above-mentioned characteristics of a coil may include the diameter (e.g., inner diameter or outer diameter), the thickness, the number of turns, or the number of layers, and may further include the direction in which the coil is wound.

Figure 6A:
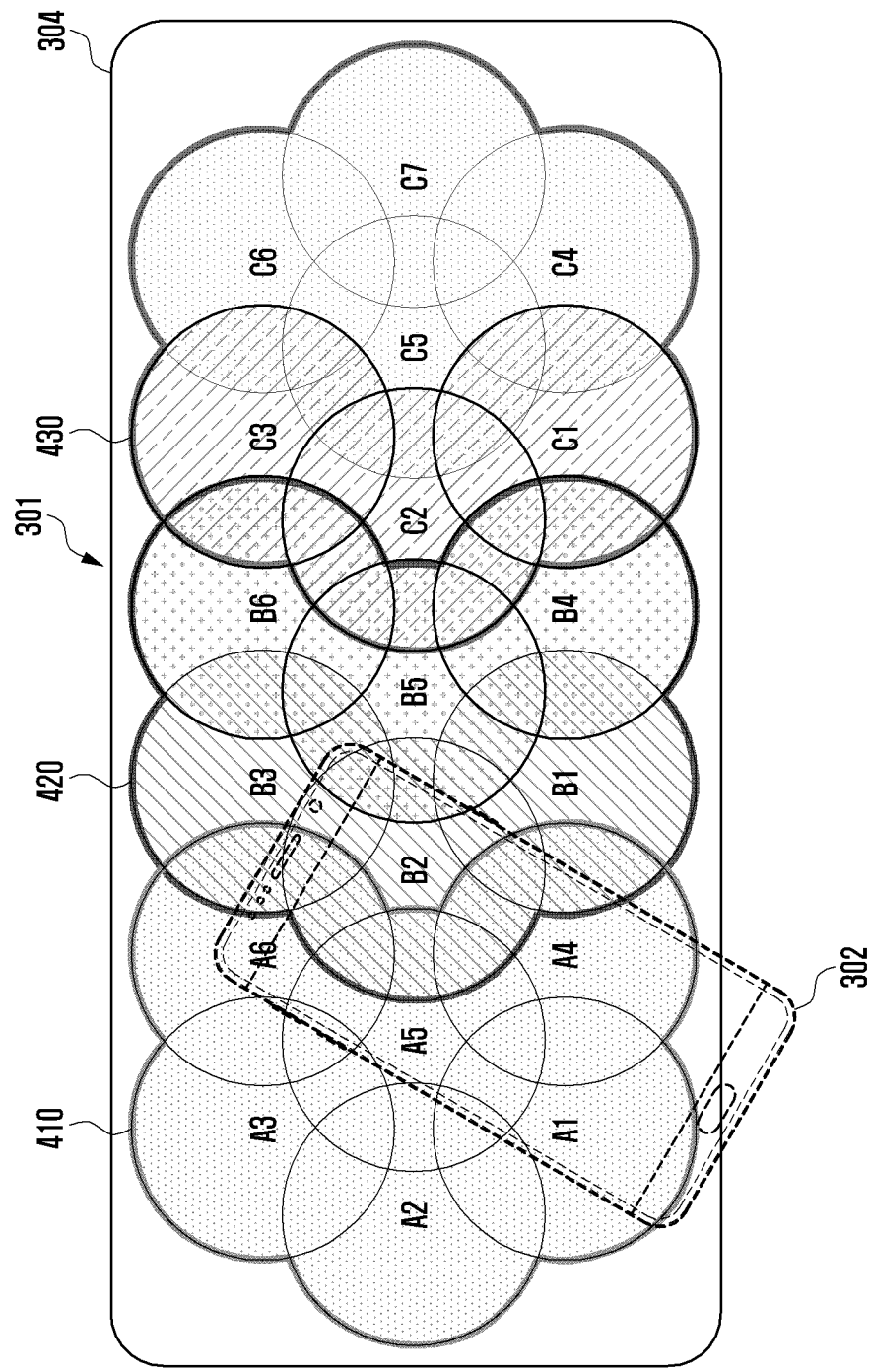
FIG. 6A depicts a charging operation when an electronic device is placed on the wireless charging device according to an embodiment of the disclosure.

FIG. 6A depicts a charging operation when an electronic device (e.g., smartphone) is placed on the wireless charging device according to an embodiment of the disclosure.

With reference to FIG. 6A, the electronic device 302 (e.g., wireless charging receiver) may be placed on the housing 304 of the wireless charging device 301 (e.g., wireless charging transmitter) for charging.

In an embodiment, to detect whether the electronic device 302 is placed on the housing 304, the processor 540 of the wireless charging device 301 may transmit a first ping signal (e.g., analog ping signal and/or Q ping signal) to the electronic device 302 separately through the first group of coils 410 (e.g., coil A1, coil A2, coil A3, coil A4, coil A5, and coil A6), the second group of coils 420 (e.g., coil B1, coil B2, coil B3, coil B4, coil B5, and coil B6), and the third group of coils 430 (e.g., coil C1, coil C2, coil C3, coil C4, coil C5, coil C6, and coil C7), and may identify the type and location of the electronic device 302.

In FIG. 6A, the electronic device 302 may be placed above coil A4 and coil A5 of the first group of coils 410 and coil B2 of the second group of coils 420 of the wireless charging device 301.

In an embodiment, the processor 540 of the wireless charging device 301 may connect the first inverter 512 to coil A4 and coil A5 of the first group of coils 410 through the first switch 514, and connect the second inverter 522 to coil B2 of the second group of coils 420 through the second switch 524.

In an embodiment, the processor 540 of the wireless charging device 301 may transmit, for example, an analog ping signal serving as a first ping signal, and may determine that the electronic device 302 is placed above coil A4 and coil A5 of the first group of coils 410 and coil B2 of the second group of coils 420 of the wireless charging device 301 if a current change is detected at the first inverter 512 and the second inverter 522.

In an embodiment, when the electronic device 302 is placed above coil A4 and coil A5 among the first group of coils 410 of the wireless charging device 301 and coil A4 and coil A5 are used for charging, the output signals (e.g., phase and frequency) of coil A4 and coil A5 may be similar. In this case, the processor 540 of the wireless charging device 301 may change the capacitance value of the first resonant element 516.

In an embodiment, the third group of coils 430 may include a plurality of coils. For example, the third group of coils 430 may include at least one coil among coil C1, coil C2, coil C3, coil C4, coil C5, coil C6, and coil C7. Coil C1, coil C2, coil C3, coil C4, coil C5, coil C6, and coil C7 may be disposed on the same layer or may be disposed on different layers.

In an embodiment, the plurality of coils belonging to the first group of coils 410 (e.g., coil A1, coil A2, coil A3, coil A4, coil A5, and coil A6), the plurality of coils belonging to the second group of coils 420 (e.g., coil B1, coil B2, coil B3, coil B4, coil B5, and coil B6), and the plurality of coils belonging to the third group of coils 430 (e.g., coil C1, coil C2, coil C3, coil C4, coil C5, coil C6, and coil C7) may be arranged to overlap one another to charge the electronic device 302.

In an embodiment, when the electronic device 302 is placed above coil A4 and coil A5 among the first group of coils 410 of the wireless charging device 301 and coil A4 and coil A5 are used for charging, different inverter output signals may be applied to coil A4 and coil A5. Coil A4 and coil A5 may be composed of coils of different groups.

In an embodiment, when a Q ping signal serving as a first ping signal is transmitted for example and a change in Q value (e.g., at least one of attenuation coefficient, coupling coefficient, or natural frequency) is detected at the first inverter 512 and the second inverter 522, the processor 540 of the wireless charging device 301 may determine that the electronic device 302 is placed above coil A4 and coil A5 of the first group of coils 410 and coil B2 of the second group of coils 420 of the wireless charging device 301.

In an embodiment, the processor 540 of the wireless charging device 301 may separately use the first group of coils 410, the second group of coils 420, and the third group of coils 430 to transmit analog ping signals or Q ping signals at the same time. The processor 540 of the wireless charging device 301 may separately use the first group of coils 410, the second group of coils 420, and the third group of coils 430 to periodically and alternatingly transmit analog ping signals or Q ping signals.

In an embodiment, the processor 540 of the wireless charging device 301 may separately use the first group of coils 410, the second group of coils 420, and the third group of coils 430 to transmit, for example, a Q ping signal serving as a first ping signal, and may obtain a Q value (e.g., at least one of attenuation coefficient, coupling coefficient, or natural frequency) for each coil.

In an embodiment, the processor 540 of the wireless charging device 301 may obtain a Q value for each of the first group of coils 410, the second group of coils 420, and the third group of coils 430, for example, as shown in Table 1 below. Table 1 relates to the example shown in FIG. 6A where the electronic device 302 is placed over the coils A4, A5, and B2.

TABLE 1

| Coil group | Coil number | | | | | | |
|---|---|---|---|---|---|---|---|
| | 1 | 2 | 3 | 4 | 5 | 6 | 7 |
| Coils of first group (A1~A6) | 50 | 50 | 50 | 36 | 35 | 50 | — |
| Coils of second group (B1~B6) | 32 | 38 | 50 | 50 | 50 | 50 | — |
| Coils of third group (C1~C7) | 50 | 50 | 50 | 50 | 50 | 50 | 50 |

In an embodiment, when identified Q values are three or more, the processor 540 of the wireless charging device 301 may normalize the identified Q values for relative comparison of the Q values between coils.

For example, as the absolute value of the Q value may change depending on whether the electronic device 302 is in a case, the processor 540 of the wireless charging device 301 may identify the location where the electronic device 302 is placed by using the values shown in Table 2 below obtained by normalizing the Q values in Table 1.

TABLE 2

| Coil group | Coil number | | | | | | |
|---|---|---|---|---|---|---|---|
| | 1 | 2 | 3 | 4 | 5 | 6 | 7 |
| Coils of first group (A1~A6) | 1 | 1 | 1 | 0.22 | 0.16 | 1 | — |
| Coils of second group (B1~B6) | 0 | 0.33 | 1 | 1 | 1 | 1 | — |
| Coils of third group (C1~C7) | 1 | 1 | 1 | 1 | 1 | 1 | 1 |

In an embodiment, normalization is the process where the distribution of data values are converted to a range of data values between 0 and 1. Through adjustment of the data distribution, normalization may offset changes in the absolute value of the Q value based on whether the electronic device 302 is placed on the wireless charging device 301. For example, absolute data values may include the measured signal X, Xmin, and Xmax, and the normalized data may be calculated by (X−Xmin)/(Xmax−Xmin).

In an embodiment, the processor 540 of the wireless charging device 301 may determine that the electronic device 302 is placed above coil A4 and coil A5 of the first group of coils 410 and coil B2 of the second group of coils 420, where coil A4, coil A5, and coil B2 have a normalized Q value between 0 and 1 (exclusive) and normalized Q values of 1 and 0 are ignored, and may select coil A4 and coil A5 among the first group of coils 410 and coil B2 among the second group of coils 420. The processor 540 of the wireless charging device 301 may configure the remaining coils, that is the coils other than the selected coil A4 and coil A5 of the first group of coils 410 and coil B2 of the second group of coils 420, as coils waiting for charging (e.g., non-operating coils).

In an embodiment, when the coils (e.g., coils A4, A5 and B2) to be used for charging the electronic device 302 are selected by using the first ping signal, the processor 540 of the wireless charging device 301 may transmit a second ping signal (e.g., digital ping signal) through the selected coils (e.g., coils A4, A5 and B2) and may wirelessly transmit power to the electronic device 302 while receiving a SSP signal from the electronic device 302.

In an embodiment, the processor 540 of the wireless charging device 301 may identify the location of the electronic device 302 based on a feedback signal (e.g., signal strength packet (SSP)) received by coil A4 and coil A5 of the first group of coils 410 and coil B2 of the second group of coils 420. For example, when coil A4 and coil A5 of the first group of coils 410 and coil B2 of the second group of coils 420, above which the electronic device 302 is placed, receive a feedback signal (e.g., signal strength packet (SSP)) greater than or equal to a specified value, the processor 540 of the wireless charging device 301 may charge the electronic device 302 using the coils A4, A5, and B2 based on the received feedback signal.

For example, the processor 540 of the wireless charging device 301 may use a second ping signal to receive an SSP signal indicating a voltage (e.g., specific value) induced across the selected transmission coils (e.g., coils A4, A5 and B2) from the rectifying circuit 321b of the electronic device 302 as shown in Table 3 below.

TABLE 3

| Coil | Specified value of SSP signal |
|---|---|
| Coil A4 | 32 |
| Coil A5 | 31 |
| Coil B2 | 36 |

In an embodiment, for example, as the specified value of the SSP signal for the selected transmission coils (e.g., coils A4, A5 and B2) is greater than or equal to a preset value (e.g., 30), the processor 540 of the wireless charging device 301 may wirelessly transmit power to the electronic device 302 by using the selected coils (e.g., coils A4, A5 and B2).

FIG. 6B depicts operations for selecting coils and charging using the selected coils when the electronic device is placed on the wireless charging device according to an embodiment of the disclosure.

With reference to FIG. 6B, the processor 540 of the wireless charging device 301 may detect coils to be used for charging during a first interval 610.

In an embodiment, during the first interval 610, to check whether the electronic device 302 is placed on the housing 304, the processor 540 of the wireless charging device 301 may separately use the first group of coils 410 (e.g., coil A1, coil A2, coil A3, coil A4, coil A5, and coil A6), the second group of coils 420 (e.g., coil B1, coil B2, coil B3, coil B4, coil B5, and coil B6), and the third group of coils 430 (e.g., coil C1, coil C2, coil C3, coil C4, coil C5, coil C6, and coil C7) to transmit a first ping signal (e.g., analog ping signal and/or Q ping signal) to the electronic device 302. The leftmost signal shown in FIG. 6B at the beginning of the first interval 610 may be an initialization signal.

During a second interval 620 in FIG. 6B, the processor 540 of the wireless charging device 301 may select the detected coils.

In an embodiment, when it is detected that the electronic device 302 is placed above coil A4 and coil A5 of the first group of coils 410 and coil B2 of the second group of coils 420 of the wireless charging device 301 as described above in the embodiment of FIG. 6A, during the second interval 620, the processor 540 of the wireless charging device 301 may select and use the corresponding coils (e.g., coils A4, A5 and B2) to transmit a second ping signal (e.g., digital ping signal) to the electronic device 302, and may receive a signal strength packet (SSP) signal from the electronic device 302.

During a third interval 630 in FIG. 6B, the processor 540 of the wireless charging device 301 may perform wireless charging by using the selected coils.

In an embodiment, during the third interval 630, the processor 540 of the wireless charging device 301 may wirelessly transmit power to the electronic device 302 by using coils that receive an SSP signal (e.g., coils A4, A5 and B2).

Figure 7:
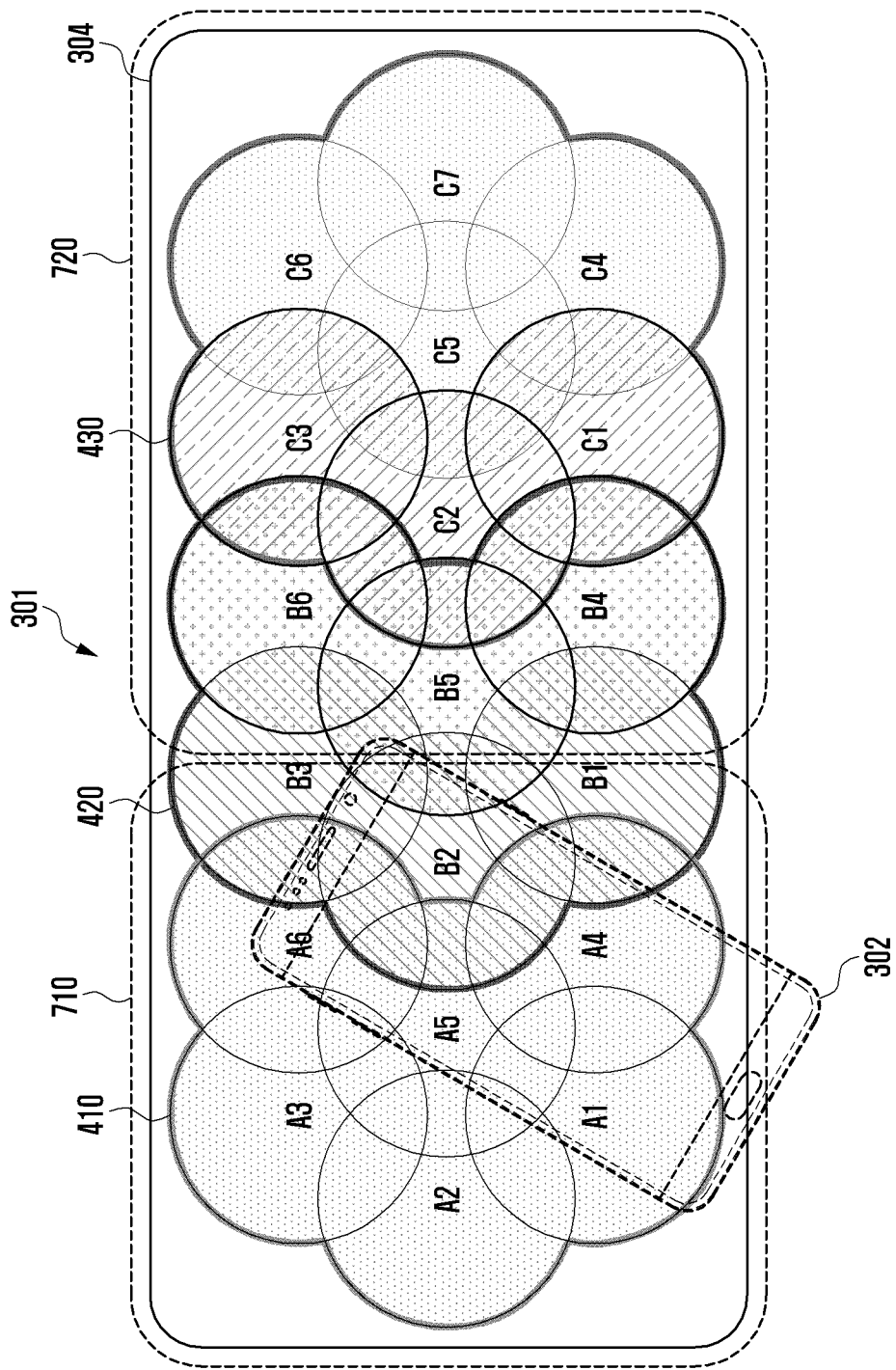
FIG. 7 illustrates a charging region and a charging standby region of the wireless charging device according to an embodiment of the disclosure.

FIG. 7 illustrates a charging region (or charging coil) and a charging standby region (or charging standby coil) of the wireless charging device according to an embodiment of the disclosure.

The embodiment of FIG. 7 may include the operations described in the embodiments of FIGS. 5 and 6.

With reference to FIG. 7, the processor 540 of the wireless charging device 301 may identify that the electronic device 302 is placed above coil A4 and coil A5 of the first group of coils 410 and coil B2 of the second group of coils 420, and may wirelessly transmit power to the electronic device 302 by using identified coil A4 and coil A5 of the first group of coils 410 and coil B2 of the second group of coils 420.

In an embodiment, the processor 540 of the wireless charging device 301 may configure the first group of coils 410 (e.g., coil A1, coil A2, coil A3, coil A4, coil A5, and coil A6) and at least some of the second group of coils 420 (e.g., coil B1, coil B2, and coil B3) as a charging region 710 for charging the electronic device 302.

In an embodiment, the processor 540 of the wireless charging device 301 may configure the coils in the second group of coils 420 (e.g., coil B3, coil B4, and coil B5) other than the coils selected for the charging region (e.g., coil B1, coil B2, and coil B3), and the third group of coils 430 (e.g., coil C1, coil C2, coil C3, coil C4, coil C5, coil C6, and coil C7)) as a charging standby region 720 for the electronic device 302.

In an embodiment, the processor 540 of the wireless charging device 301 may configure the coils in the second group of coils 420 (e.g., coil B3, coil B4, and coil B5) other than the coils selected for the charging region (e.g., coil B1, coil B2, and coil B3), and/or the third group of coils 430 (e.g., coil C1, coil C2, coil C3, coil C4, coil C5, coil C6, and coil C7) as charging standby coils.

In an embodiment, the processor 540 of the wireless charging device 301 may transmit a first ping signal (analog ping signal and/or Q ping signal) by using at least some of the second group of coils 420 (e.g., coil B3, coil B4, and coil B5) and/or the third group of coils 430 (e.g., coil C1, coil C2, coil C3, coil C4, coil C5, coil C6, and coil C7) belonging to the charging standby region 720.

Figure 8:
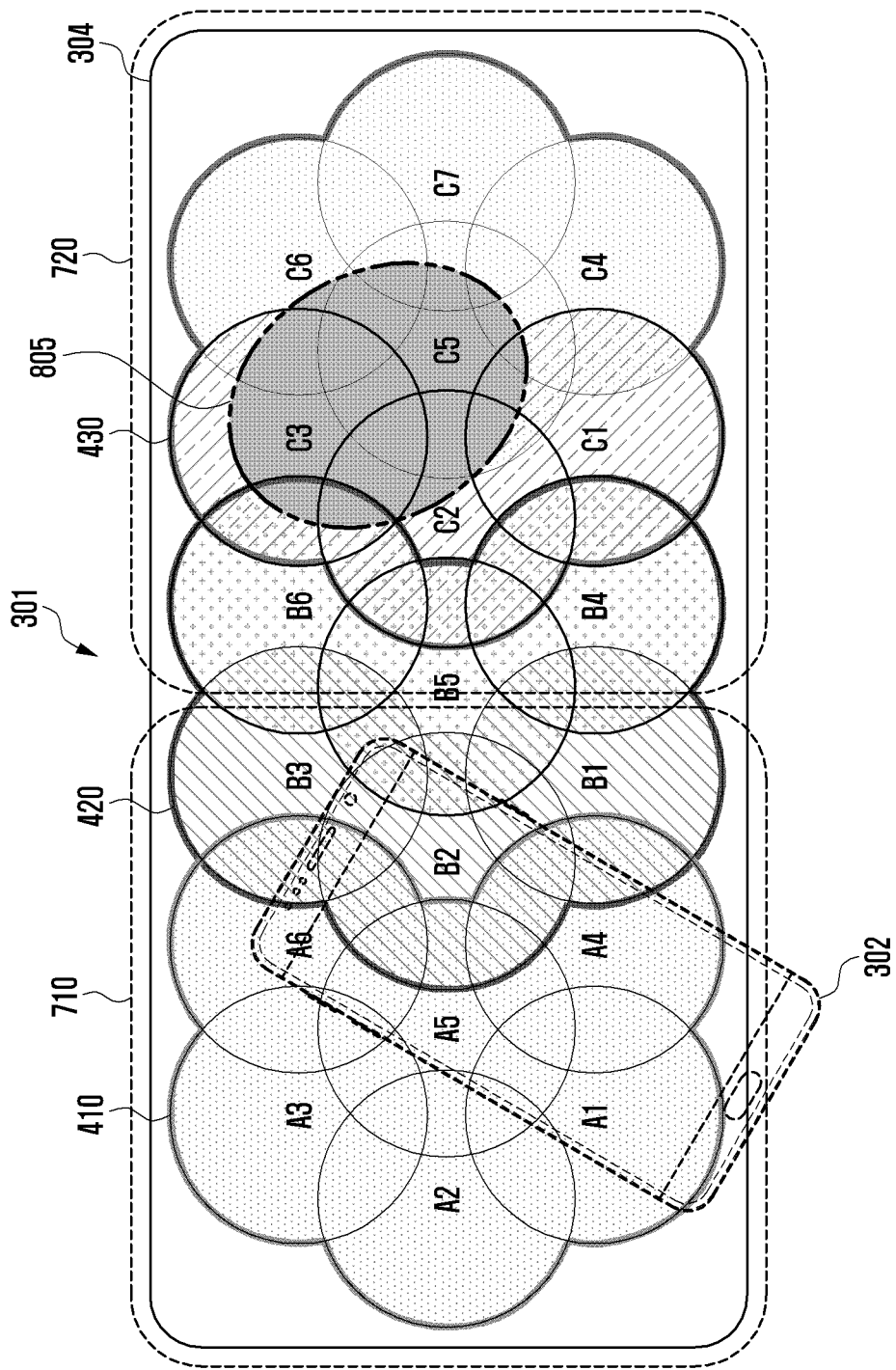
FIG. 8 depicts an operation when the wireless charging device detects a non-chargeable object while charging an electronic device according to an embodiment of the disclosure.

FIG. 8 depicts an operation when the wireless charging device detects a non-chargeable object while charging an electronic device according to an embodiment of the disclosure.

The embodiment of FIG. 8 may include the operations described in the embodiments of FIGS. 5 to 7.

With reference to FIG. 8, while charging the electronic device 302 by using coil A4 and coil A5 of the first group of coils 410 and coil B2 of the second group of coils 420 belonging to the charging region 710, the processor 540 of the wireless charging device 301 may check whether a non-rechargeable object 805 that does not require charging (e.g., metallic object or foreign object such as a coin or a clip) is placed in the charging standby region 720 (e.g., at least some of the second group of coils 420 (coil B3, coil B4, coil B5)) and/or above the third group of coils 430 (e.g., coil C1, coil C2, coil C3, coil C4, coil C5, coil C6, and coil C7).

In an embodiment, when a non-chargeable object 803 is placed in the charging standby region 720, the processor 540 of the wireless charging device 301 may identify the non-chargeable object 805 to be, for example, a metallic object that does not require charging.

In an embodiment, the processor 540 of the wireless charging device 301 may transmit a first ping signal (analog ping signal and/or Q ping signal) by using at least some of the second group of coils 420 (e.g., coil B3, coil B4, and coil B5) and/or the third group of coils 430 (e.g., coil C1, coil C2, coil C3, coil C4, coil C5, coil C6, and coil C7) belonging to the charging standby region 720.

In an embodiment, when the measured Q values (e.g., at least one of attenuation coefficient, coupling coefficient, or natural frequency) of at least some of the second group of coils 420 (e.g., coil B3, coil B4, coil B5) and the third group of coils 430 (e.g., coils C1 to C7) are less than or equal to the specified value, the processor 540 of the wireless charging device 301 may determine that there is a non-chargeable object 805.

In an embodiment, if a current change greater than or equal to the specified value is measured in the second inverter 522 and the third inverter 532 when transmitting a second ping signal (e.g., digital ping signal) by using at least some of the second group of coils 420 (e.g., coil B3, coil B4, coil B5) and the third group of coils 430 (e.g., coils C1 to C7), the processor 540 of the wireless charging device 301 may determine that there is a non-chargeable object 805.

In an embodiment, if a SSP signal is not normally received from the electronic device 302 when transmitting a second ping signal (e.g., digital ping signal) by using coil A4 and coil A5 of the first group of coils 410 and coil B2 of the second group of coils 420 belonging to the charging region 710, the processor 540 of the wireless charging device 301 may determine that there is a non-chargeable object 805.

In an embodiment, when a non-rechargeable object 805 that does not require charging (e.g., metallic object or foreign object such as a coin or a clip) is placed in the charging standby region 720 (e.g., at least some of the second group of coils 420 (coil B3, coil B4, coil B5) and third group of coils 430 (coil C1, coil C2, coil C3, coil C4, coil C5, coil C6, coil C7)) while charging the electronic device 302 by using coil A4 and coil A5 of the first group of coils 410 and coil B2 of the second group coil 420 belonging to the charging region 710 is taking place, the processor 540 of the wireless charging device 301 may suspend charging of the electronic device 302 by using coil A4 and coil A5 of the first group of coils 410 and coil B2 of the second group coil 420 belonging to the charging region 710.

In an embodiment, when a non-rechargeable object 805 that does not require charging (e.g., foreign object such as a coin or a clip) is placed in the charging standby region 720 (e.g., at least some of the second group of coils 420 (coil B3, coil B4, coil B5) and third group of coils 430 (coil C1, coil C2, coil C3, coil C4, coil C5, coil C6, coil C7)) while charging the electronic device 302 by using coil A4 and coil A5 of the first group of coils 410 and coil B2 of the second group coil 420 belonging to the charging region 710 is taking place, the processor 540 of the wireless charging device 301 may discontinue charging standby of at least some of the second group of coils 420 (e.g., coil B3, coil B4, coil B5) and/or the third group of coils 430 (e.g., coil C1, coil C2, coil C3, coil C4, coil C5, coil C6, coil C7) belonging to the charging standby region 720, and may keep charging by using coil A4 and coil A5 of the first group of coils 410 and coil B2 of the second group coil 420 belonging to the charging region 710. When charging standby is discontinued, it may be referred to as a charging standby stopped state.

In an embodiment, when the non-chargeable object 805 is removed from the charging standby region 720 (e.g., at least some of the second group of coils 420 (coil B3, coil B4, coil B5) and third group of coils 430 (coil C1, coil C2, coil C3, coil C4, coil C5, coil C6, coil C7)), the processor 540 of the wireless charging device 301 may determine whether to transition from the charging standby stopped state to the charging standby state.

In an embodiment, the processor 540 of the wireless charging device 301 may control at least some of the second group of coils 420 (e.g., coil B3, coil B4, coil B5) and/or the third group of coils 430 (e.g., coil C1, coil C2, coil C3, coil C4, coil C5, coil C6, coil C7) belonging to the charging standby region 720 to transmit a first ping signal (e.g., analog ping signal and/or Q ping signal) having a relatively short transmission period.

In an embodiment, compared with the change in current and/or voltage occurring in the second inverter 522 and the third inverter 532 due to the first ping signal (analog ping signal and/or Q ping signal) when the non-chargeable object 805 is placed on the housing 304, if a larger change in current and/or voltage occurs in the second inverter 522 and the third inverter 532 due to the first ping signal (analog ping signal and/or Q ping signal) when the non-chargeable object 805 is absent, the processor 540 of the wireless charging device 301 may determine that the non-chargeable object 805 has been removed from the upper portion of the housing 304 and may cause at least some of the second group of coils 420 (e.g., coil B3, coil B4, coil B5) and/or the third group of coils 430 (e.g., coil C1, coil C2, coil C3, coil C4, coil C5, coil C6, coil C7) belonging to the charging standby region 720 to transition from the charging standby stopped state to the charging standby state.

Figure 9:
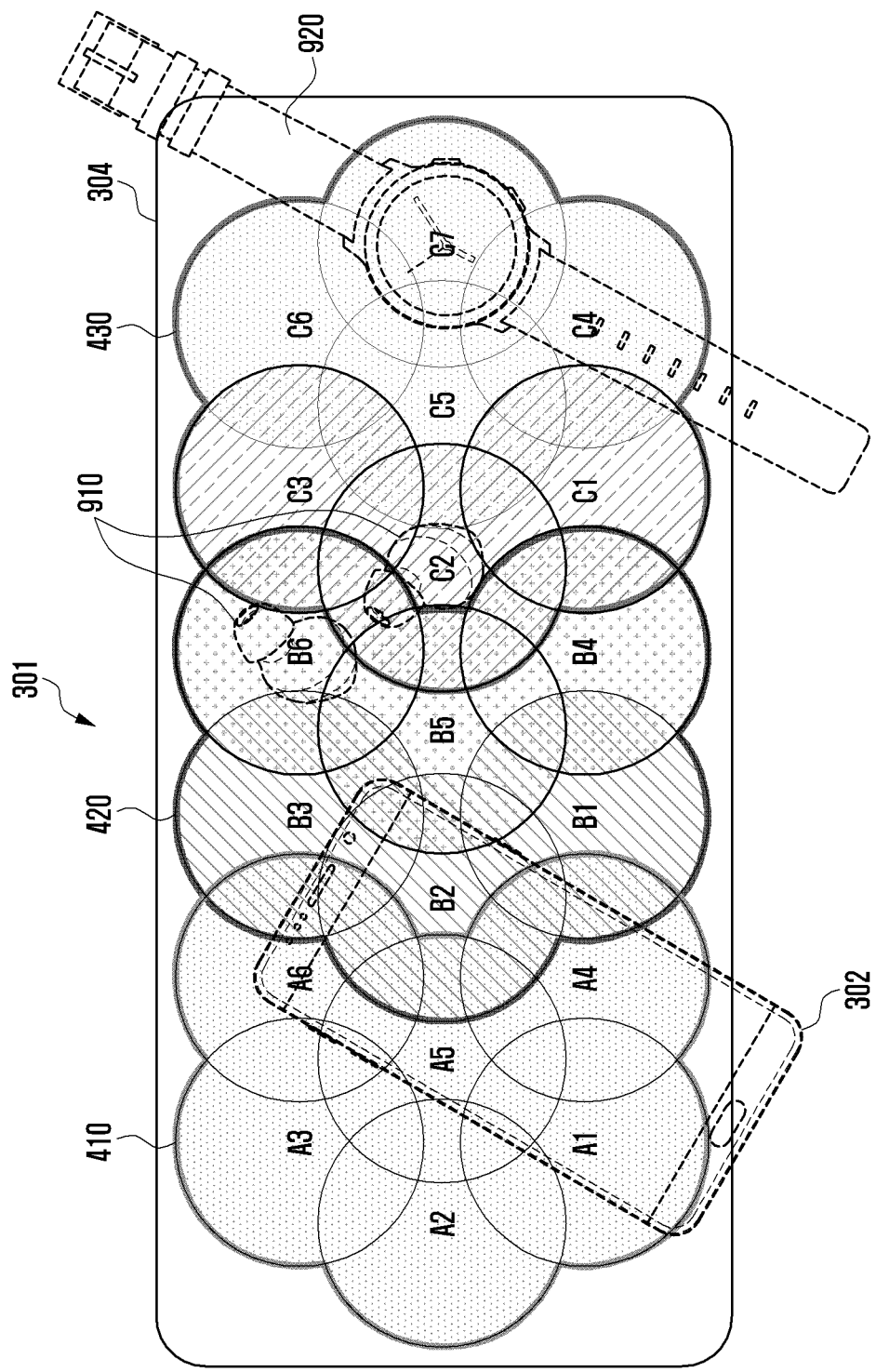
FIG. 9 illustrates a case where a plurality of electronic devices are charged by the wireless charging device according to an embodiment of the disclosure.

FIG. 9 illustrates a case where a plurality of electronic devices are charged by the wireless charging device according to an embodiment of the disclosure.

In an embodiment of the disclosure, with reference to FIG. 9, for wireless charging, an electronic device 302 (e.g., smartphone), wireless earphones 910, and/or a wearable device 920 (e.g., watch) may be placed on the housing 304 of the wireless charging device 301.

In the description on FIG. 9, to charge a plurality of electronic devices, the wireless charging device 301 may further include additional instances for the first converter 510, the first inverter 512, the first switch 514, the first group of coils 410, the first resonant element 516, the second converter 520, the second inverter 522, the second switch 524, the second group of coils 420, the second resonant element 526, the third converter 530, the third inverter 532, the third switch 534, the third group of coils 430, and the third resonant element 536 included in the wireless charging device 301 shown in FIG. 5.

In an embodiment, the first group of coils 410, the second group of coils 420, and the third group of coils 430 may each be connected to a plurality of inverters instead of one inverter.

In an embodiment, the third group of coils 430 may include a plurality of coils. For example, the third group of coils 430 may include at least two coils among coil C1, coil C2, coil C3, coil C4, coil C5, coil C6, and coil C7. Coil C1, coil C2, coil C3, coil C4, coil C5, coil C6, and coil C7 may be disposed on the same layer or may be disposed on different layers.

In an embodiment, the plurality of coils belonging to the first group of coils 410 (e.g., coil A1, coil A2, coil A3, coil A4, coil A5, and coil A6), the plurality of coils belonging to the second group of coils 420 (e.g., coil B1, coil B2, coil B3, coil B4, coil B5, and coil B6), and the plurality of coils belonging to the third group of coils 430 (e.g., coil C1, coil C2, coil C3, coil C4, coil C5, coil C6, and coil C7) may be arranged to overlap one another to charge the electronic device 302.

In an embodiment, to detect whether an object to be charged (e.g., electronic device 302 such as a smartphone, wireless earphones 910, and/or wearable device 920 such as a watch) is placed on the housing 304, the processor 540 of the wireless charging device 301 may transmits a first ping signal (e.g., analog ping signal and/or Q ping signal) to the electronic device 302 separately through the first group of coils 410 (e.g., coil A1, coil A2, coil A3, coil A4, coil A5, and coil A6), the second group of coils 420 (e.g., coil B1, coil B2, coil B3, coil B4, coil B5, and coil B6), and the third group of coils 430 (e.g., coil C1, coil C2, coil C3, coil C4, coil C5, coil C6, and coil C7), and may identify the type and location of the electronic device 302, the wireless earphones 910, and/or the wearable device 920.

In an embodiment, the electronic device 302 (e.g., smartphone) may be placed above coil A4 and coil A5 of the first group of coils 410 and coil B2 of the second group of coils 420 of the wireless charging device 301. The wireless earphones 910 may be placed above coil B6 of the second group of coils 420 and coil C2 of the third group of coils 430. The wearable device 920 (e.g., watch) may be placed above coil C7 of the third group of coils 430 of the wireless charging device 301.

In an embodiment, the processor 540 of the wireless charging device 301 may connect the first inverter 512 to coil A4 and coil A5 of the first group of coils 410 and coil B2 of the second group of coils 420 through the first switch 514, connect the second inverter 522 to coil B6 of the second group of coils 420 and coil C2 of the third group of coils 430 through the second switch 524, and connect the third inverter 532 to coil C7 of the third group of coils 430 through the third switch 534.

In an embodiment, the processor 540 of the wireless charging device 301 may transmit, for example, an analog ping signal serving as a first ping signal, detect a current change occurring at the first inverter 512, the second inverter 522, and the third inverter 532, and determine that objects to be charged (e.g., electronic device 302 such as a smartphone, wireless earphones 910, and/or wearable device 920 such as a watch) are separately placed above coil A4 and coil A5 of the first group of coils 410 and coil B2 of the second group of coils 420 of the wireless charging device 301, above coil B6 of the second group of coils 420 and coil C2 of the third group of coils 430, and above coil C7 of the third group of coils 430.

In an embodiment, the processor 540 of the wireless charging device 301 may transmit, for example, a Q ping signal serving as a first ping signal, detect a change in the Q value (e.g., at least one of attenuation coefficient, coupling coefficient, or natural frequency) occurring at the first inverter 512, the second inverter 522 and the third inverter 532, and determine that objects to be charged (e.g., electronic device 302 such as a smartphone, wireless earphones 910, and/or wearable device 920 such as a watch) are separately placed above coil A4 and coil A5 of the first group of coils 410 and coil B2 of the second group of coils 420 of the wireless charging device 301, above coil B6 of the second group of coils 420 and coil C2 of the third group of coils 430, and above coil C7 of the third group of coils 430.

In an embodiment, when the coils to be used (i.e., coil A4 and coil A5 of the first group of coils 410 and coil B2 of the second group of coils 420, coil B6 of the second group of coils 420 and coil C2 of the third group of coils 430, and coil C7 of the third group of coils 430) for charging the objects to be charged (e.g., electronic device 302 such as a smartphone, wireless earphones 910, and/or wearable device 920 such as a watch) are selected using the first ping signal, the processor 540 of the wireless charging device 301 may transmit a second ping signal (e.g., digital ping signal) by using the selected coils, and may wirelessly transmit power to the electronic device 302 while receiving a SSP signal from each of the objects to be charged (e.g., electronic device 302 such as a smartphone, wireless earphones 910, and/or wearable device 920 such as a watch).

According to an embodiment of the disclosure, a wireless charging device 301 may include: a first inverter 512; a first switch 514 electrically connected to the first inverter 512; a second inverter 522; a second switch 524 electrically connected to the second inverter 522; a first group of coils 410 connected to the first inverter 512 through the first switch 514; a second group of coils 420 connected to the second inverter 522 through the second switch 524; and a processor 540 operatively connected to the first inverter 512, the first switch 514, the second inverter 522, the second switch 524, the first group of coils 410, and the second group of coils 420. The processor 540 may be configured to: transmit a first ping signal through the first group of coils 410 and the second group of coils 420; sense a change in at least one of current, voltage, or frequency occurring in the first group of coils 410 and the second group of coils 420 in response to the first ping signal to detect that at least one electronic device 302 is placed on or in proximity to the wireless charging device 301; select at least one coil (e.g., coil A4, coil A5) and at least one coil (e.g. coil B2) respectively from the first group of coils 410 and the second group of coils 420 at which the change in at least one of current, voltage, or frequency is sensed; transmit a second ping signal through the selected at least one coil of the first group of coils 410 (e.g., coil A4, coil A5) and the selected at least one coil of the second group of coils 420 (e.g., coil B2); and wirelessly transmit power to the at least one electronic device 302 by using the selected at least one coil of the first group of coils 410 and the selected at least one coil of the second group of coils 420.

In an embodiment, the transmission period of the first ping signal may be shorter than the transmission period of the second ping signal.

In an embodiment, the first group of coils 410 and the second group of coils 420 may be disposed on the same layer or different layers.

In an embodiment, the first ping signal may be at least one of an analog ping signal or a Q ping signal, and the second ping signal may be a digital ping signal.

In an embodiment, the central axes of a plurality of coils (e.g., coils A1 to A7) of the first group of coils 410 and a plurality of coils (e.g., coils B1 to B6) of the second group of coils 420 may be arranged so as not to coincide one another.

In an embodiment, the wireless charging device 301 may further include a third inverter 532, a third switch 534 electrically connected to the third inverter 532, and a third group of coils 430 connected to the third inverter 532 through the third switch 534.

In an embodiment, when at least one electronic device (e.g., devices 302, 910 and 920) is placed on or in proximity to the wireless charging device 301, the processor 540 of the wireless charging device 301 may be configured to wirelessly transmit power to the at least one electronic device by using the selected at least one coil of the first group of coils 410, the selected at least one coil of the second group of coils 420, and at least one coil of the third group of coils 430.

In an embodiment, the processor 540 may be configured to set the remaining coils other than the selected at least one coil of the first group of coils 410 and the selected at least one coil of the second group of coils 420 as charging standby coils.

In an embodiment, when a non-chargeable object 805 is placed above or in proximity to the charging standby coils, the processor 540 may be configured to stop wirelessly transmitting power to the at least one electronic device through the selected at least one coil of the first group of coils 410 and the selected at least one coil of the second group of coils 420.

In an embodiment, when a non-chargeable object 805 is placed above or in proximity to the charging standby coils, the processor 540 may be configured to stop the charging standby state of the charging standby coils, and continue to wirelessly transmit power to the at least one electronic device 302 by using the selected at least one coil of the first group of coils 410 and the selected at least one coil of the second group of coils 420.

In an embodiment, when the non-chargeable object 805 is removed from the charging standby coils, the processor 540 may be configured to resume the charging standby state of the charging standby coils.

Figure 10:
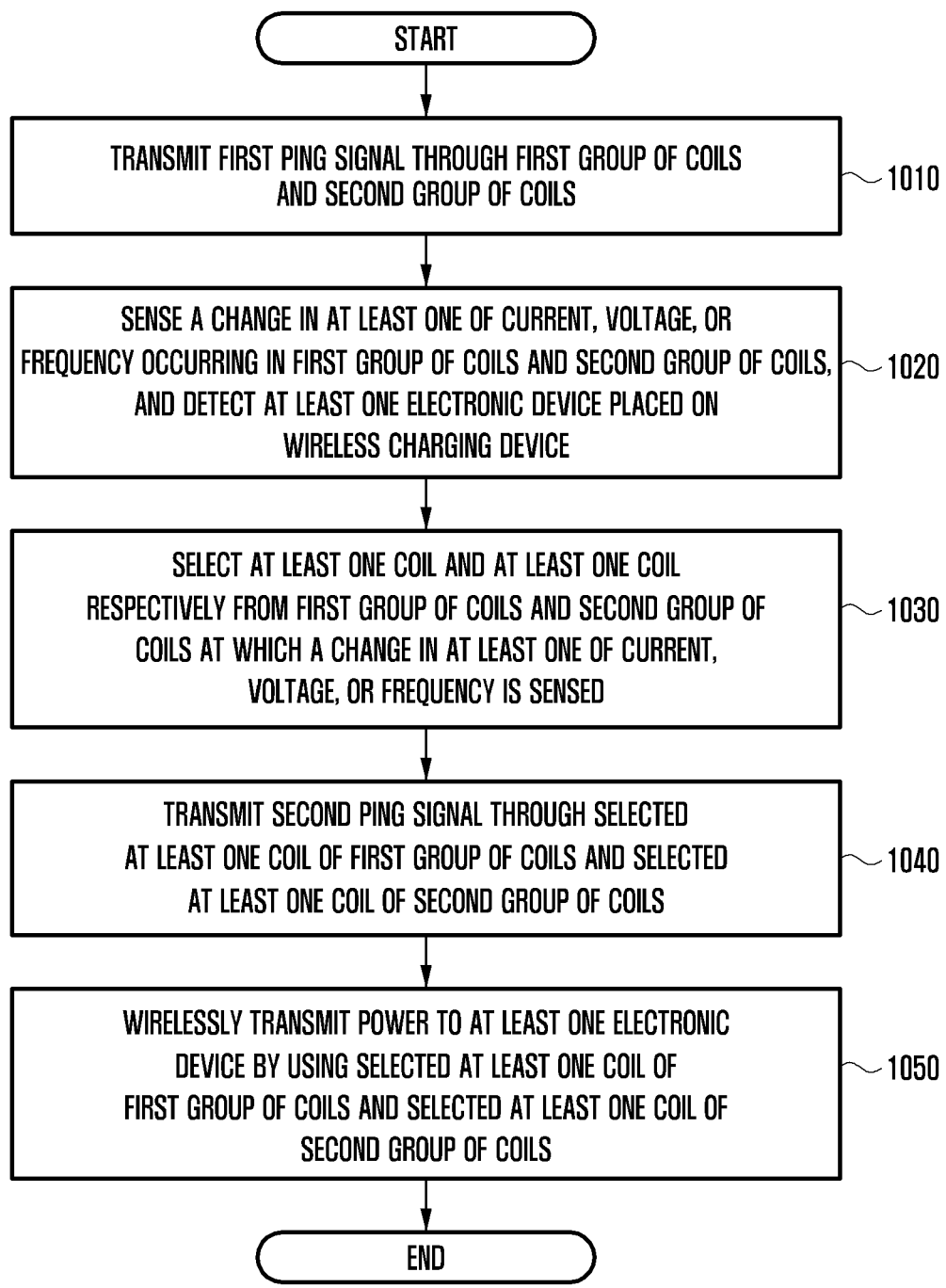
FIG. 10 is a flowchart of a method for the wireless charging device to charge at least one electronic device according to an embodiment of the disclosure.

FIG. 10 is a flowchart of a method for the wireless charging device to charge at least one electronic device according to an embodiment of the disclosure.

The description shown in FIG. 10 is illustrative and may include operations described in the embodiments of FIGS. 3A to 9.

At operation 1010, the processor 540 of the wireless charging device 301 may transmit a first ping signal (e.g., analog ping signal and/or Q ping signal) to at least one electronic device (e.g., electronic device 302 such as a smartphone, wireless earphones 910, and/or wearable device 920 such as a watch shown in FIG. 9) through the first group of coils 410 (e.g., coil A1, coil A2, coil A3, coil A4, coil A5, and coil A6) and the second group of coils 420 (e.g., coil B1, coil B2, coil B3, coil B4, coil B5, and coil B6).

At operation 1020, the processor 540 of the wireless charging device 301 may sense a change in at least one of current, voltage, or frequency occurring in the first group of coils 410 and the second group of coils 420 in response to the first ping signal and may detect the at least one electronic device 302 (e.g., electronic device 302 such as a smartphone, wireless earphones 910, and/or wearable device 920 such as a watch shown in FIG. 9) placed on the wireless charging device 301.

At operation 1030, the processor 540 of the wireless charging device 301 may select at least one coil (e.g., coil A4 and coil A5 in FIG. 6) and at least one coil (e.g. coil B2) respectively from among the first group of coils 410 and the second group of coils 420 at which a change in at least one of current, voltage, or frequency is sensed.

At operation 1040, the processor 540 of the wireless charging device 301 may transmit a second ping signal (e.g., digital ping signal) to the at least one electronic device 302 (e.g., electronic device 302 such as a smartphone, wireless earphones 910, and/or wearable device 920 such as a watch shown in FIG. 9) through the selected at least one coil of the first group of coils 410 (e.g., coil A4 and coil A5 in FIG. 6) and the selected at least one coil of the second group of coils 420 (e.g., coil B2).

At operation 1050, the processor 540 of the wireless charging device 301 may wirelessly transmit power to the at least one electronic device 302 (e.g., electronic device 302 such as a smartphone, wireless earphones 910, and/or wearable device 920 such as a watch shown in FIG. 9) by using the selected at least one coil (e.g., coil A4 and coil A5 in FIG. 6) of the first group of coils 410 and the selected at least one coil (e.g., coil B2) of the second group of coils 420.

Hereinabove, embodiments of the disclosure have been described with reference to the accompanying drawings. It should be understood that many variations and modifications of the basic inventive concept described herein will still fall within the spirit and scope of the disclosure as defined in the appended claims and their equivalents.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. A wireless charging device comprising:
a first inverter;
a first switch electrically connected to the first inverter;
a second inverter;
a second switch electrically connected to the second inverter;
a first group of coils connected to the first inverter through the first switch;

a second group of coils connected to the second inverter through the second switch; and
a processor operatively connected to the first inverter, the first switch, the second inverter, the second switch, the first group of coils, and the second group of coils,
wherein the processor is configured to:
transmit a first ping signal through the first group of coils and the second group of coils;
sense a change in current, voltage, and/or frequency occurring in the first group of coils and the second group of coils in response to the first ping signal to detect that at least one electronic device is placed on or in proximity to the wireless charging device;
select at least one coil from the first group of coils and at least one coil from the second group of coils at which the change in current, voltage, and/or frequency is sensed;
transmit a second ping signal through the selected at least one coil of the first group of coils and the selected at least one coil of the second group of coils;
wirelessly transmit power to the at least one electronic device by using the selected at least one coil of the first group of coils and the selected at least one coil of the second group of coils; and
set remaining coils other than the selected at least one coil of the first group of coils and the selected at least one coil of the second group of coils as charging standby coils.

2. The wireless charging device of claim 1, wherein a transmission period of the first ping signal is shorter than a transmission period of the second ping signal.

3. The wireless charging device of claim 1, wherein the first group of coils and the second group of coils are disposed on a same layer or different layers.

4. The wireless charging device of claim 1, wherein:
the first ping signal is an analog ping signal and/or a Q ping signal; and
the second ping signal is a digital ping signal.

5. The wireless charging device of claim 1, wherein central axes of a plurality of coils of the first group of coils and a plurality of coils of the second group of coils are arranged so as not to coincide one another.

6. The wireless charging device of claim 1, further comprising:
a third inverter;
a third switch electrically connected to the third inverter; and
a third group of coils connected to the third inverter through the third switch,
wherein, when the at least one electronic device is placed on or in proximity to the wireless charging device, the processor is further configured to wirelessly transmit power to the at least one electronic device by using the selected at least one coil of the first group of coils, the selected at least one coil of the second group of coils, and at least one coil of the third group of coils.

7. The wireless charging device of claim 1, wherein, when a non-chargeable object is placed above or in proximity to the charging standby coils, the processor is further configured to stop wirelessly transmitting power to the at least one electronic device through the selected at least one coil of the first group of coils and the selected at least one coil of the second group of coils.

8. The wireless charging device of claim 1, wherein, when a non-chargeable object is placed above or in proximity to the charging standby coils, the processor is further configured to:
stop a charging standby state of the charging standby coils; and
continue to wirelessly transmit power to the at least one electronic device by using the selected at least one coil of the first group of coils and the selected at least one coil of the second group of coils.

9. The wireless charging device of claim 8, wherein, when the non-chargeable object is removed from the charging standby coils, the processor is further configured to resume the charging standby state of the charging standby coils.

10. A method for a wireless charging device to charge at least one electronic device, the method comprising:
transmitting, by a processor of the wireless charging device, a first ping signal through a first group of coils and a second group of coils;
sensing a change in current, voltage, and/or frequency occurring in the first group of coils and the second group of coils in response to the first ping signal, and detecting that the at least one electronic device is placed on or in proximity to the wireless charging device;
selecting at least one coil from the first group of coils and at least one coil from the second group of coils at which the change in current, voltage, and/or frequency is sensed;
transmitting a second ping signal through the selected at least one coil of the first group of coils and the selected at least one coil of the second group of coils;
wirelessly transmitting power to the at least one electronic device by using the selected at least one coil of the first group of coils and the selected at least one coil of the second group of coils; and
setting remaining coils other than the selected at least one coil of the first group of coils and the selected at least one coil of the second group of coils as charging standby coils.

11. The method of claim 10, wherein a transmission period of the first ping signal is shorter than a transmission period of the second ping signal.

12. The method of claim 10, wherein the first group of coils and the second group of coils are disposed on a same layer or different layers.

13. The method of claim 10, wherein:
the first ping signal is an analog ping signal and/or a Q ping signal; and
the second ping signal is a digital ping signal.

14. The method of claim 10, wherein central axes of a plurality of coils of the first group of coils and a plurality of coils of the second group of coils are arranged so as not to coincide one another.

15. The method of claim 10, wherein the wireless charging device further includes a third inverter, a third switch electrically connected to the third inverter, and a third group of coils connected to the third inverter through the third switch, and the method further comprises wirelessly transmitting, when the at least one electronic device is placed on or in proximity to the wireless charging device, power to the at least one electronic device by using the selected at least one coil of the first group of coils, the selected at least one coil of the second group of coils, and at least one coil of the third group of coils.

16. The method of claim 10, further comprising stopping, when a non-chargeable object is placed above or in proximity to the charging standby coils, wirelessly transmitting power to the at least one electronic device through the selected at least one coil of the first group of coils and the selected at least one coil of the second group of coils.

17. The method of claim 10, further comprising, when a non-chargeable object is placed above or in proximity to the charging standby coils:
- stopping a charging standby state of the charging standby coils; and
- continuing to wirelessly transmit power to the at least one electronic device by using the selected at least one coil of the first group of coils and the selected at least one coil of the second group of coils.

18. The method of claim 17, further comprising, when the non-chargeable object is removed from the charging standby coils, resuming the charging standby state of the charging standby coils.

* * * * *